US008231286B2

(12) United States Patent
Sapir-Haim et al.

(10) Patent No.: US 8,231,286 B2
(45) Date of Patent: Jul. 31, 2012

(54) SYSTEM FOR PRINTING A BOOK ON PRE-BOUND PAGES

(75) Inventors: Roni Reuven Sapir-Haim, Kfar Saba (IL); Ehoud Graff, Haifa (IL)

(73) Assignee: Revoprint Ltd., Tel Aviv (IL)

( * ) Notice: Subject to any disclaimer, the term of this patent is extended or adjusted under 35 U.S.C. 154(b) by 797 days.

(21) Appl. No.: 12/331,878

(22) Filed: Dec. 10, 2008

(65) Prior Publication Data

US 2009/0129842 A1 May 21, 2009

Related U.S. Application Data

(63) Continuation-in-part of application No. 11/131,289, filed on May 18, 2005, now Pat. No. 7,547,152.

(51) Int. Cl.
*G03B 27/62* (2006.01)
*B42D 9/04* (2006.01)
*B41J 3/28* (2006.01)
*B41J 29/00* (2006.01)

(52) U.S. Cl. ............................................ 400/28; 400/24

(58) Field of Classification Search .................... 400/24, 400/25, 26, 27, 28; 399/379; 84/487, 509, 84/518

See application file for complete search history.

(56) References Cited

U.S. PATENT DOCUMENTS 2,170,049 A 8/1939 Faeber
4,029,193 A 6/1977 Kwan
4,143,977 A 3/1979 Kurihara et al.
4,480,517 A 11/1984 Miyamoto
4,503,960 A 3/1985 Koeleman et al.
4,527,814 A 7/1985 Carter et al.
4,776,711 A 10/1988 Harada (Continued)

FOREIGN PATENT DOCUMENTS

DE 19537742 4/1997

(Continued)

OTHER PUBLICATIONS

International Search Report for PCT Application No. PCT/IL06/00582 mailed on Jun. 30, 2008.

(Continued)

*Primary Examiner* — Daniel J Colilla

(74) *Attorney, Agent, or Firm* — Pearl Cohen Zedek Latzer, LLP

(57) ABSTRACT

An apparatus is disclosed, for printing on the pages of a block of printable pages that are pre-bound by a binding along a binding-edge of each page. The apparatus includes a block support structure comprising two height-adjustable tables for supporting the block of printable pages in two adjacent stacks, so that when a page is turned from atop a first stack to an adjacent second stack, the two adjacent stacks present substantially co-planar printable top surfaces. The apparatus also includes a moveable bridge adapted to movement in at least one dimension, comprising a printing device, and configured to move the printing device in a controlled manner over the printable top surfaces so as to print on said printable top surfaces; and a page-turning mechanism connected to the moveable bridge, comprising a roller configured for partially lifting a bound top page of the first stack, and a page-flipping tab for sliding under the partially lifted bound top page so that when the bridge is moved the partially lifted bound top page is flipped over to the second stack presenting new printable top surfaces for the printing device to print on.

20 Claims, 18 Drawing Sheets

U.S. PATENT DOCUMENTS

| | | | | |
|---|---|---|---|---|
| 4,928,995 | A | 5/1990 | Pickering et al. | |
| 5,156,465 | A | 10/1992 | Kakiuchi | |
| 5,191,379 | A | 3/1993 | Manzer et al. | |
| 5,267,799 | A | 12/1993 | Nukada | |
| 5,471,277 | A | 11/1995 | Fujioka et al. | |
| 5,682,227 | A | 10/1997 | Taguchi et al. | |
| 5,806,991 | A | 9/1998 | Hubler | |
| 5,969,795 | A * | 10/1999 | Honda | 355/25 |
| 6,036,381 | A | 3/2000 | Mizukami | |
| 6,762,356 | B2 | 7/2004 | McNab et al. | |
| 7,006,263 | B2 | 2/2006 | Takahashi | |
| 2001/0022911 | A1 | 9/2001 | Kimura et al. | |
| 2002/0054372 | A1 | 5/2002 | Takahashi | |
| 2004/0016337 | A1 | 1/2004 | McNab et al. | |

FOREIGN PATENT DOCUMENTS

| | | | |
|---|---|---|---|
| EP | 0381137 | | 8/1990 |
| EP | 0503476 | | 9/1992 |
| JP | 62-270354 | | 11/1987 |
| JP | 2200496 | | 8/1990 |
| JP | 03182925 | | 8/1991 |
| JP | 3-287246 | | 12/1991 |
| JP | 04001741 | A * | 1/1992 |
| JP | 04156765 | A * | 5/1992 |
| JP | 4226398 | | 8/1992 |
| JP | 05162485 | | 6/1993 |
| JP | 6171268 | | 6/1994 |
| JP | 8142542 | | 6/1996 |
| JP | 11242364 | A * | 9/1999 |
| JP | 2004082515 | | 3/2004 |
| SI | 9800056 | | 10/1999 |
| WO | WO2006123338 | A2 | 11/2006 |

OTHER PUBLICATIONS

Office Action for U.S. Appl. No. 11/131,289 mailed on May 13, 2008.

Office Action for U.S. Appl. No. 12/349,237 mailed on Nov. 23, 2009.

Supplementary European Search Report for European Patent Application No. 06745104.7 mailed on Oct. 26, 2010.

Office Action for Japanese Patent Application No. 2008-511862 mailed on Mar. 29, 2011.

Office Action for U.S. Appl. No. 12/497,814 mailed on Jan. 11, 2012.

* cited by examiner

SYSTEM FOR PRINTING A BOOK ON PRE-BOUND PAGES

CROSS REFERENCE TO RELATED APPLICATIONS

This application is a continuation-in-part application of U.S. patent application Ser. No. 11/131,289, entitled "System for Book Printing and Assembly Using a Pre-Bound Page Block", filed on May 18, 2005 now U.S. Pat. No. 7,547,152, which is incorporated in its entirety herein by reference.

FIELD OF THE INVENTION

The present invention relates to printing. In particular, the present invention relates to printing a book on pre-bound pages.

BACKGROUND OF THE INVENTION

The state of the art of book printing and assembly, while having seen much in improved mechanization that is addressed to the speed and quality of the printing and binding processes, has seen little change in the basic steps of book printing and assembly.

Generally speaking, the process is as follows. First, the pages are printed. Next, the pages are cut in order to be collated or assembled into signatures. Then, the text block is formed by connecting the signatures, either by sewing or gluing. Finally, the cover is attached. Therefore, the process of forming the text block is performed only on the number of pages in the book and the process is repeated for each book being produced.

This process is well suited for mass production, but leaves little room for affordable production of a small number of books, and is totally unsuited for production of a single book.

U.S. Pat. No. 4,776,711 discloses a printing apparatus for printing on the pages of a pre-bound bank passbook. This apparatus employs two printing devices, one associated with each of the exposed pages. The two printing devices are used to compensate for the different heights of each of the pages.

There is therefore a need for a system for producing a book by printing directly on the pages of a pre-bound page block, separating the printed pages from the page block and attaching a cover to the resultant text block. It would be beneficial if the system employed a single printing device.

SUMMARY OF THE INVENTION

The present invention is a system for producing a book by printing directly on the pages of a pre-bound page block, separating the printed pages from the page block and attaching a cover to the resultant text block.

According to the teachings of the present invention there is provided, a method for producing printed material, the method comprising: a) providing a block configured from a plurality of blank pages that are pre-bound by a binding along a binding-edge of each page; b) arranging the block so as to form two adjacent stacks interconnected by the binding, such that at least one of a plurality of the printable pages is deployed in a first stack and a remainder of the plurality of the printable pages are deployed in a second stack, and printable top surfaces of the first stack and the second stack are co-planar; c) generating relative movement between a printing device and the printable top surfaces so as to print on the top surface of at least one of the first stack and the second stack; d) redeploying a top page of the second stack to the first stack so as to produce new the printable top surfaces; and e) repeating steps (c) and (d) as required to print a number of pages required.

According to a further teaching of the present invention, there is also provided, separating printed pages of the printed material from the block.

According to a further teaching of the present invention, the separating printed pages is accomplished using a cutting element associated with the printing device, the cutting element configured to separate the first stack from the second stack.

According to a further teaching of the present invention, there is also provided, attaching the printed pages of the printed material to a book-cover that includes an attachment configuration for interconnection with the printed pages of the printed material.

According to a further teaching of the present invention, the book-cover is implemented as a pre-fabricated adjustable book-cover with an adhesive spine area shielded by at least one peal-off cover-sections configured to reveal a predetermined adhesive area when removed, such that an area of the adhesive spine corresponding to a size of a binding area of the printed pages of the printed material is revealed for the attaching.

According to a further teaching of the present invention, there is also provided, providing two block support tables each associated with a corresponding one of the first stack and the second stack, a relative height of the block support tables being adjustable so as to maintain the co-planar printable top surfaces of the first stack and the second stack.

According to a further teaching of the present invention, there is also provided, adjusting a height of each of the first stack and the second stack subsequent to each the redeploying the top page of the second stack to the first stack so as to deploy the new the printable top surfaces at a predetermined printing height.

According to a further teaching of the present invention, there is also provided, determining the number of pages redeployed during the redeploying the top page of the second stack to the first stack using a sensor configured determine the thickness of material redeployed.

There is also provided according to the teachings of the present invention, an apparatus for printing on the pages of a block of printable pages that are pre-bound by a binding along a binding-edge of each page, the apparatus comprising: a) an apparatus frame; b) a block support structure configured to allow deployment of the block in the frame so as to form two adjacent stacks interconnected by the binding, such that at least one of a plurality of the printable pages is deployed in a first stack and a remainder of the plurality of the printable pages are deployed in a second stack, and printable top surfaces of the first stack and the second stack are co-planar; c) a printing device associated with the frame; d) a displacement mechanism configured to generate relative movement between the printing device and the printable top surfaces so as to print on the top surface of at least one of the first stack and the second stack; and e) a page turning mechanism associated with the frame, the page turning mechanism configured for redeploying a bound top page of the second stack to the first stack so as to produce a new the printable top surface.

According to a further teaching of the present invention, the binding is a flexible adhesive binding.

According to a further teaching of the present invention, the block support structure includes with two block support tables each associated with a corresponding one of the first stack and the second stack, the two block support tables configured such that a relative height of the block support tables is adjustable so as to maintain the co-planar printable top surfaces of the first stack and the second stack.

According to a further teaching of the present invention, there is also provided, at least one top surface positioning element configured to control a height of the printable top surface during printing.

According to a further teaching of the present invention, the displacement mechanism is configured to move the printing device about an X and Y axes of the printable top surface.

According to a further teaching of the present invention, the page turning mechanism is associated with the displacement mechanism such that return of the printing device to a home position affects the redeploying the top page of the second stack to the first stack.

According to a further teaching of the present invention, the page turning mechanism includes at least one page turning arm displaceable between a page printing position and a page turning position.

According to a further teaching of the present invention, there is also provided, a page lifting mechanism configured to lift the top page of the second stack for engagement with the page turning arm and redeployment to the first stack.

According to a further teaching of the present invention, the page lifting mechanism includes an electrostatic element.

According to a further teaching of the present invention, there is also provided, a sensor configured to determine is a single page was turned by the page turning mechanism.

According to a further teaching of the present invention, there is also provided, a cutting element configured to separate the first stack from the second stack.

There is also provided according to the teachings of the present invention, a kit for preparation of bound printed material, the kit comprising; a) a block of printable pages that are pre-bound by a binding; b) an apparatus for printing on pages of the block of printable pages; and c) a book-cover that includes an attachment configuration for interconnection with pre-bound printed pages of the printed material.

There is furthermore provided, in accordance with some embodiments of the present invention, an apparatus for printing on the pages of a block of printable pages that are pre-bound by a binding along a binding-edge of each page. The apparatus includes a block support structure comprising two height-adjustable tables for supporting the block of printable pages in two adjacent stacks, so that when a page is turned from atop a first stack to an adjacent second stack, the two adjacent stacks present substantially co-planar printable top surfaces; a moveable bridge adapted to movement in at least one dimension, comprising a printing device, and configured to move the printing device in a controlled manner over the printable top surfaces so as to print on said printable top surfaces; and a page-turning mechanism connected to the moveable bridge, comprising a roller configured for partially lifting a bound top page of the first stack, and a page-flipping tab for sliding under the partially lifted bound top page so that when the bridge is moved the partially lifted bound top page is flipped over to the second stack presenting new printable top surfaces for the printing device to print on.

Furthermore, according to some embodiments of the present invention, the page-turning mechanism comprises an electric motor for driving the roller.

Furthermore, according to some embodiments of the present invention, the roller is rotatable about a rotation axis that is substantially perpendicular to a direction of motion of the moveable bridge.

Furthermore, according to some embodiments of the present invention, the flipping tab is located on a leading edge of the moveable bridge.

Furthermore, according to some embodiments of the present invention, the block support structure comprises a controller and at least one sensor for sensing the height of either of the printable top surfaces.

Furthermore, according to some embodiments of the present invention, said at least one sensor is coupled to the moveable bridge.

Furthermore, according to some embodiments of the present invention, said at least one sensor is coupled to the printing device.

Furthermore, according to some embodiments of the present invention, said at least one sensor comprises at least two sensing devices, wherein one of said at least two sensing devices is configured to sense if the height of said either of the printable top surfaces exceeds a maximum acceptable value, and another one of said at least two sensing devices is configured to sense if the height of said either of the printable top surfaces exceeds a minimum acceptable value.

Furthermore, according to some embodiments of the present invention, the apparatus includes a separating mechanism for separating between the first and second stacks of pages.

Furthermore, according to some embodiments of the present invention, the separating mechanism comprises a wire and a wire-pulling device for pulling the wire between the first and second stacks of pages, thus separating between the first and second stacks of pages.

Furthermore, according to some embodiments of the present invention, the wire-pulling device is attached to the printing device, whereby movement of the printing device pulls the wire.

Furthermore, according to some embodiments of the present invention, the apparatus includes a device for raising and lowering the wire.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

The present invention is a system for producing a book by printing directly on the pages of a pre-bound page block, separating the printed pages from the page block and attaching a cover to the resultant text block.

The principles and operation of a system for producing a book according to the present invention may be better understood with reference to the drawings and the accompanying description.

By way of introduction, the present invention includes a printing apparatus, a method for producing a book using such an apparatus, and a kit for the preparation of pre-bound printed material, which includes the printing apparatus, block of pre-bound printable pages and bookcover. The printing apparatus is configured to print on the pages of a block of printable pages that are pre-bound by a binding along a binding-edge of each page. Since the pages are bound together before printing, it is necessary to arrange the block in two interconnected stacks that are joined by the flexible binding. Printing is performed on the top surfaces of each of the stacks, and then a page is redeployed from one stack to the other. During the redeployment process, the page is turned, thereby revealing an un-printed side of the page. Since the height of each of the stacks changes each time a page is redeployed, the printing apparatus includes two height-adjustable stack support tables each associated with a corresponding one of the two stacks.

As used herein, the phrase "printable pages" refers to pages that may be printed using the printing apparatus of the present invention. It is within the scope of the present invention that such pages may be pre-printed with, but not limited to, watermarks, background designs, illustration, and pictures. The term "pre-bound" as used herein refers to the interconnection of a number of individual pages along one edge of each page by any binding method known in the art. The use of the phrase "bound printed material" herein refers to substantially any print medium in which pages are bound together such as, but not limited to, books, booklets, notebooks, pamphlets, brochures, and catalogs.

Figure 1:
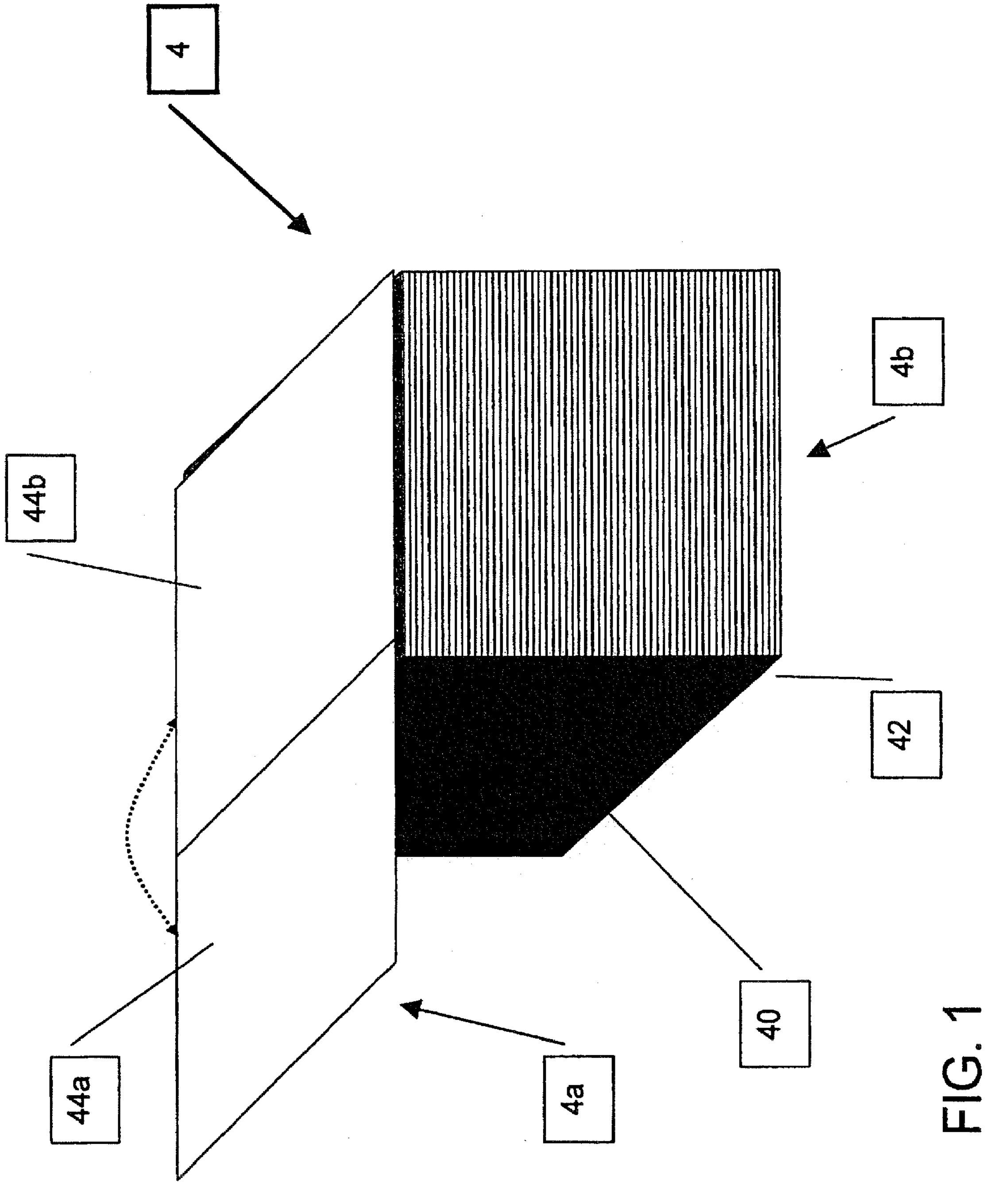
FIG. 1 is an isometric view of a block of printable pages that are pre-bound by a binding along a binding-edge of each page, constructed and operative according to the teachings of the present invention.

Referring now to the drawings, FIG. 1 illustrates the block 4 of printable pages that is pre-bound by a flexible binding 40 along a binding-edge 42 of each page. During the printing process, the block 4 is arranged in two stacks 4*a* and 4*b* that are joined by the flexible binding 40. Printing is performed on the printable top surfaces 44*a* and 44*b* of the two stacks 4*a* and 4*b*.

Figure 2:
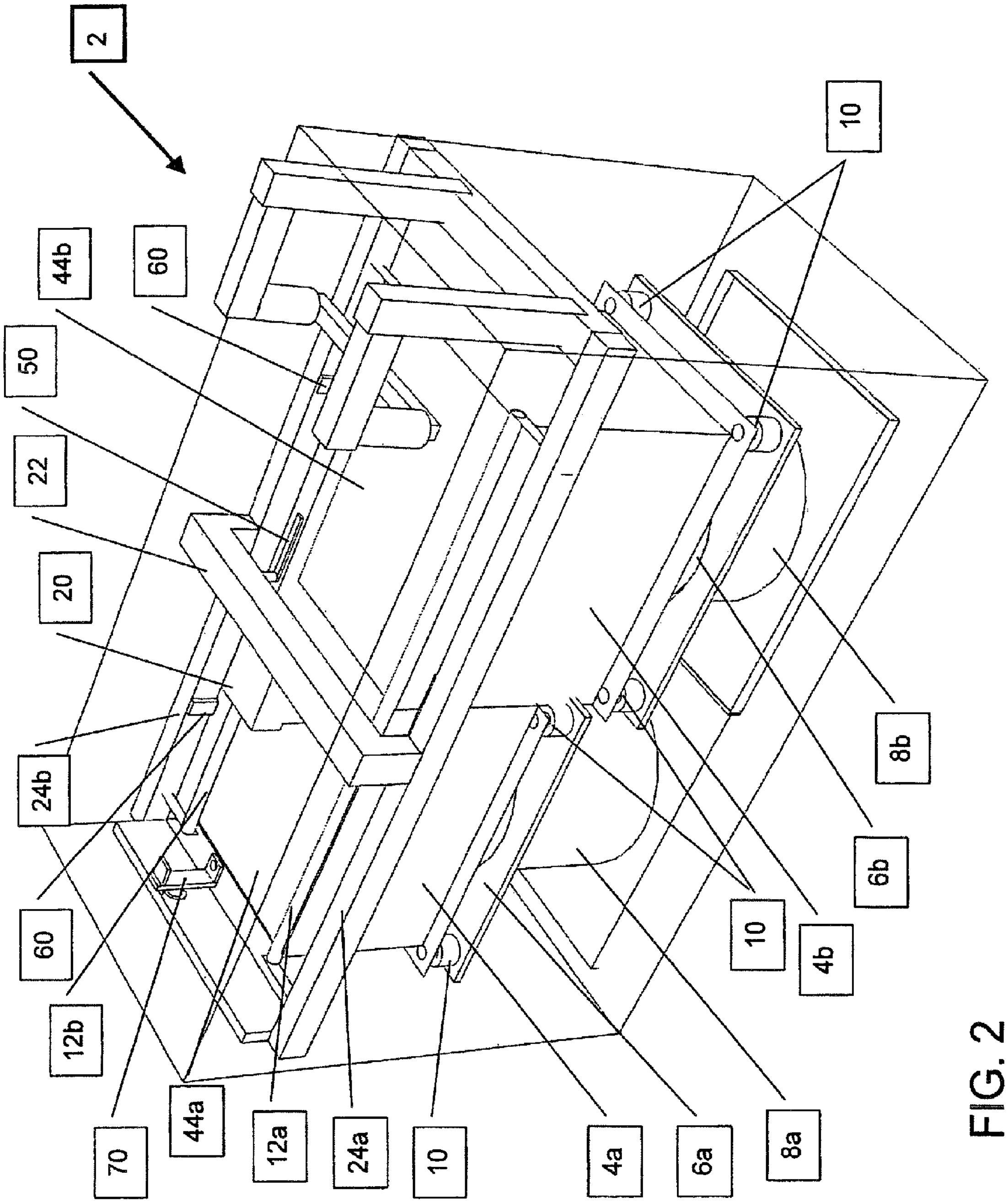
FIG. 2 is an isometric view of a preferred embodiment of a printing apparatus constructed and operative according to the teachings of the present invention.

FIG. 2 illustrates a preferred embodiment of the printing apparatus of the present invention, generally referred to herein as 2. The two stacks 4*a* and 4*b* are arranged on the height-adjustable stack support tables 6*a* and 6*b*, respectively. The height of the height-adjustable stack support tables 6*a* and 6*b* is varied by height-adjustable elements 8*a* and 8*b*. Movement of the height-adjustable elements 8*a* and 8*b* may be actuated by, but not limited to, electric motors, pneumatic devices, hydraulic devices, or substantially any other suitable device know in the art. Preferably, the height-adjustable stack support tables 6*a* and 6*b* are configured with shock absorbing springs 10 to cushion the effects of the height adjustment process, and allow for the final height adjustments of each of the two stacks 4*a* and 4*b* as they are pressed against the paper limit guides 12*a* and 12*b*, as described below. It should be noted that while the springs 10 may represent what may be considered the best mode contemplated for carrying out the invention, other configurations such as, but not limited to, cushioned tables and flexible tables are also within the scope of the present invention.

Figure 3:
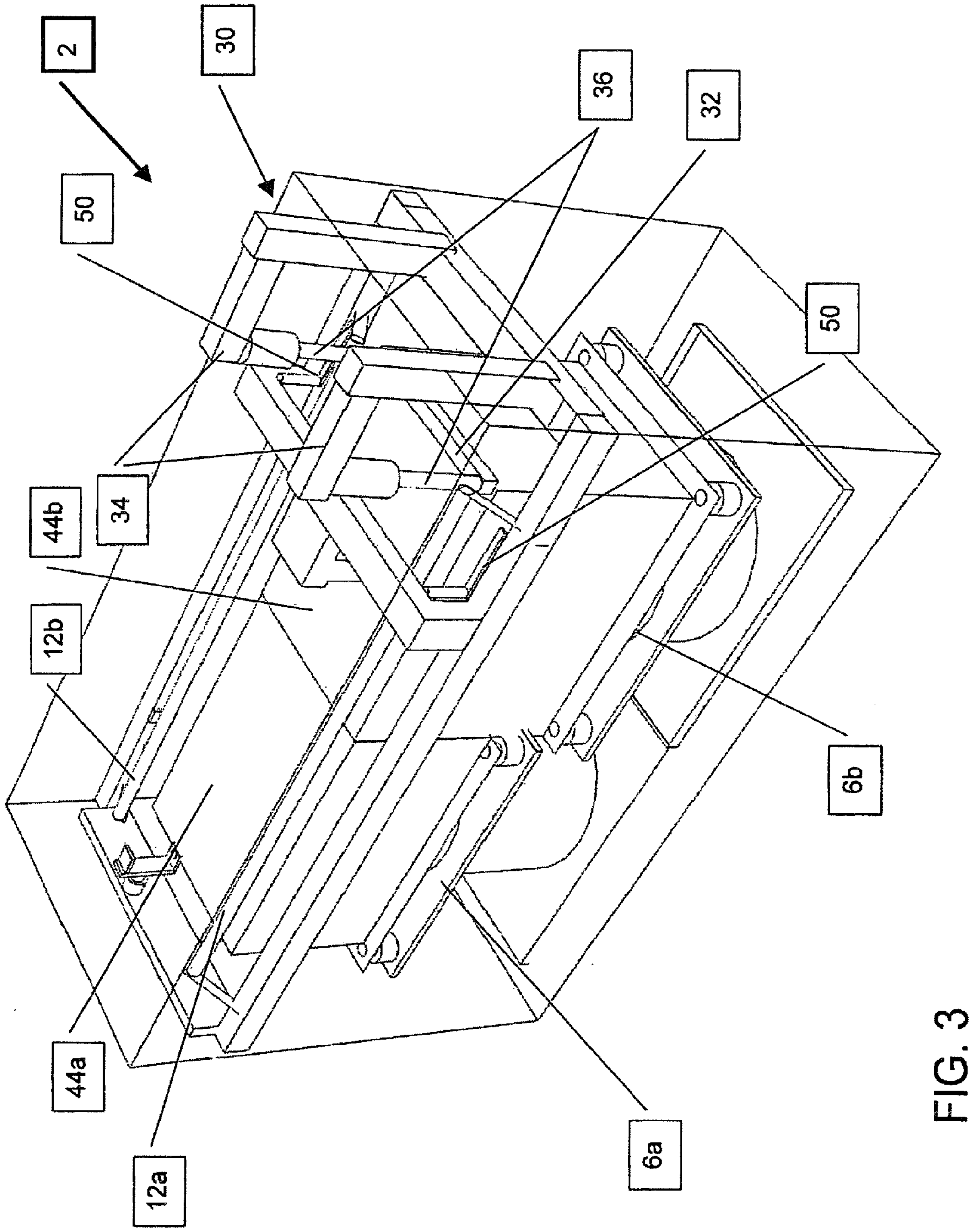
FIGS. 3-5 are a series of isometric views of the embodiment of FIG. 2, showing the turning process according to the teachings of the present invention.
Figure 4:
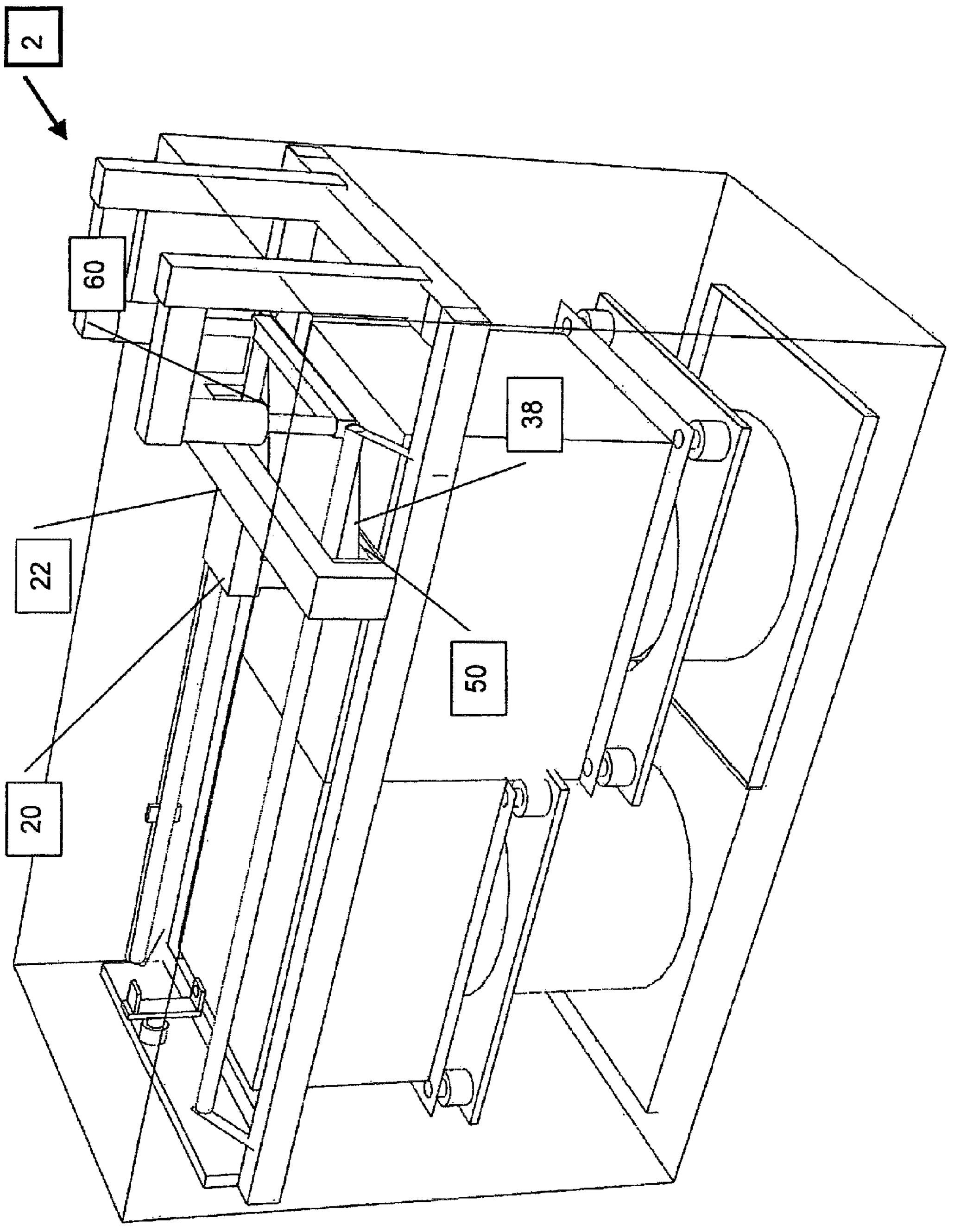
Figure 5:
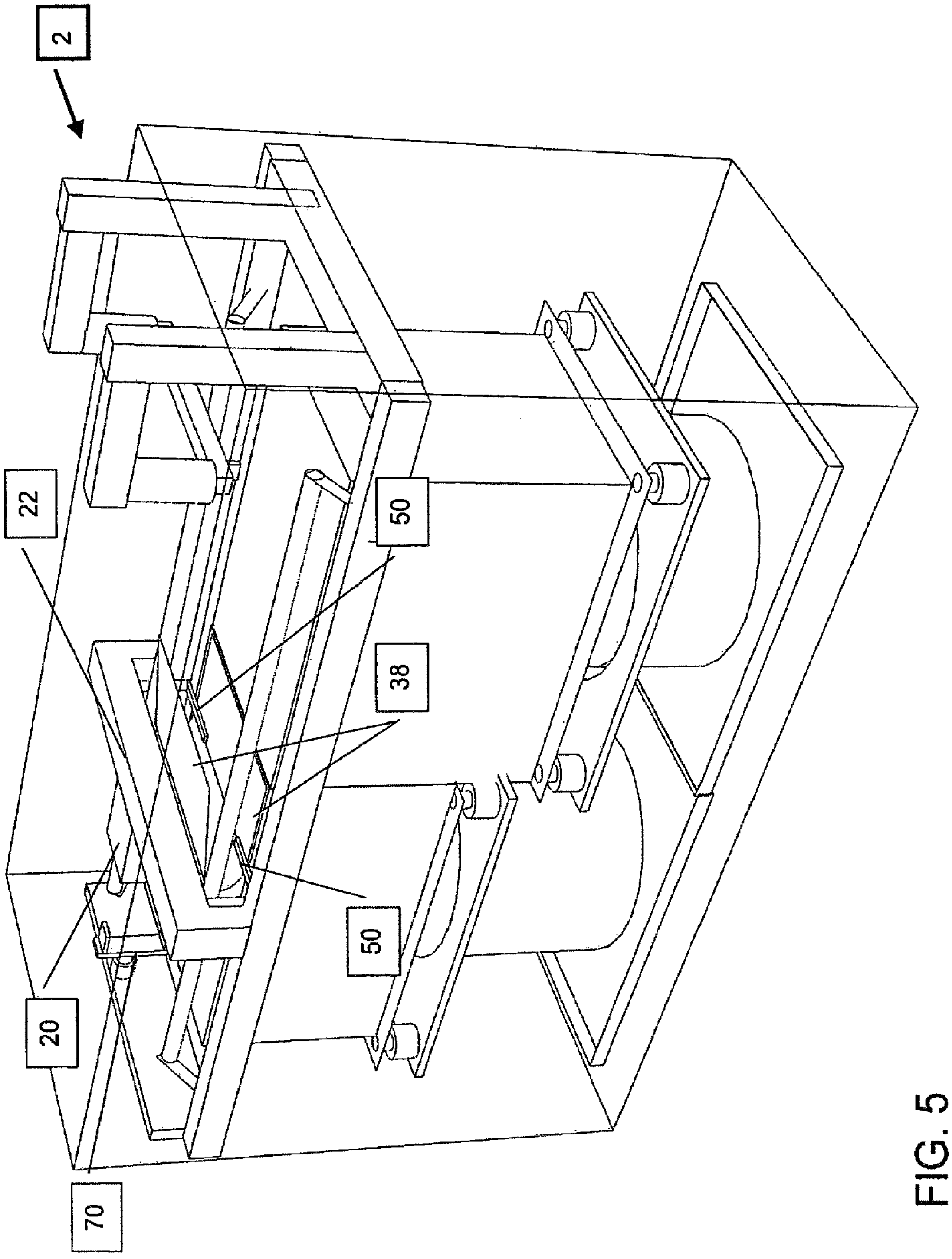

In order to provide a substantially planar printing surface consisting of the printable top surfaces 44*a* and 44*b* of the two stacks 4*a* and 4*b*, the printing apparatus 2 includes substantially parallel paper limit guides 12*a* and 12*b*, which are displaceable between a printing position (FIG. 2) and a paper deployment position (FIGS. 3-5). During the printing process, the paper limit guides 12*a* and 12*b* are deployed in the printing position, such that the printable top surfaces 44*a* and 44*b* are pressed against the paper limit guides 12*a* and 12*b* by the height-adjustable elements 8*a* and 8*b*. The paper limit guides 12*a* and 12*b* are deployed in the paper deployment position when block 4 is initially deployed in the printing apparatus 2, during redeployment of the top page of stack 44*b* to stack 44*a*, and when all or part of block 4 is removed from the printing apparatus 2. It should be noted that the use of stationary paper limit guides may also be employed and is considered to be within the scope of the present invention.

The printing device 20 is preferably driven so as to traverse the Y-axis rail 22, as Y-axis rail 22 is driven along the parallel X-axis rails 24*a* and 24*b*.

As illustrated in FIGS. 3-5, once printing is completed on the printable top surfaces 44*a* and 44*b*, the height-adjustable stack support tables 6*a* and 6*b* are lowered and the paper limit guides 12*a* and 12*b* are raised to the paper deployment position.

FIG. 3 further illustrates the page lifting mechanism 30. Preferably, the page lifting mechanism 30 includes an electrostatic element 32, which is supported by beams 34, and raised and lowered by arms 36. The electrostatic element 32 is therefore lowered to top surface 44*b* and then raised, bringing with it the top page 38 (best seen in FIGS. 4 and 5) of stack 4*b*. Once the top page 38 of stack 4*b* is raised, page-turning arms 50 are rotated from a printing position (FIGS. 2 and 3) to a page turning position (FIGS. 4 and 5). As the Y-axis rail returns the printing device 20 to a home position, the page-turning arm redeploys top page 38 to the top of stack 4*a*, as illustrated in FIG. 5. It will be understood that any device and method used to redeploy and turn the top page of one stack to the other is within the scope of the present invention. It should be noted the scope of the present invention includes employment of a lifting element configured of, but not limited to, an electrostatic element, a vacuum element, and any other element attachable to a page, known in the art.

Figure 6:
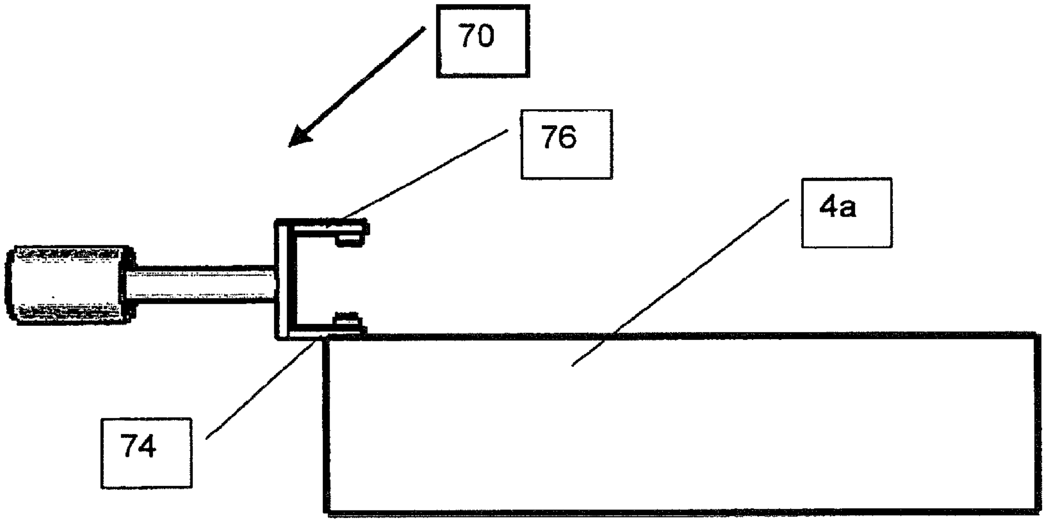
FIGS. 6 and 7 are side elevations illustrating the process of verifying the number of pages turned, according to the teachings of the present invention.
Figure 7:
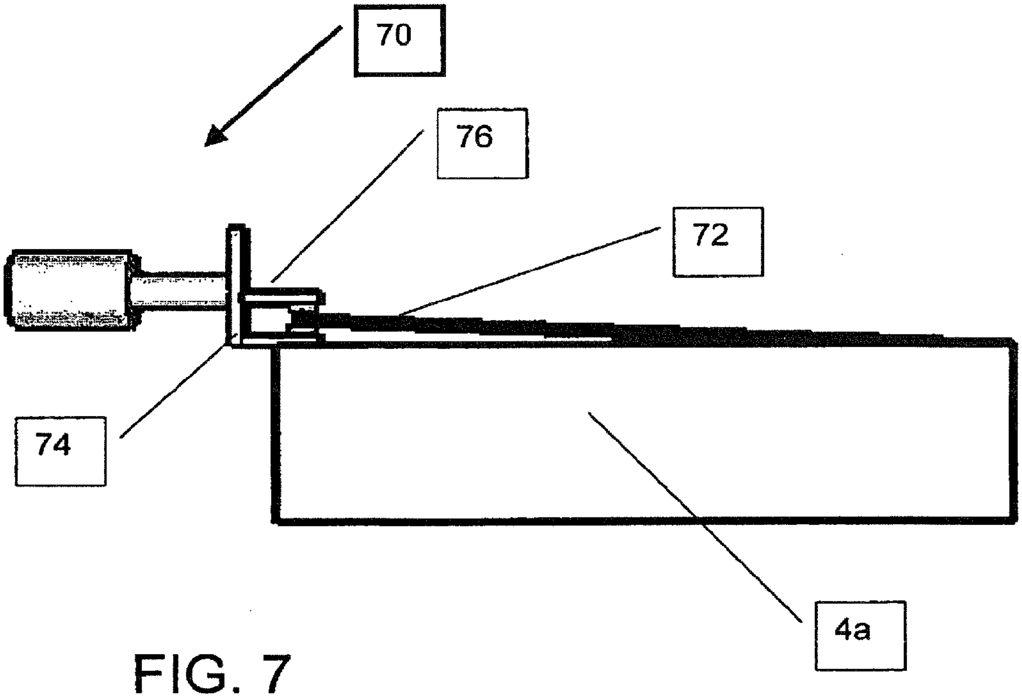

Preferably, the page turning process includes verifying that only one page has been redeployed. This may be accomplished with the use of any of a number of sensing devices known in the art, or by determining the change in the height of each of the stacks 4*a* and 4*b*. Preferably, however, the thickness of the material redeployed to the top of stack 4*a* is measured by gauge 70, which is best illustrated in FIGS. 6 and 7. As illustrated, gauge 70 is extended such that the extreme edge of the material redeployed 72 falls onto the bottom arm 74, the top arm 76 is then lowered to the top surface of the material redeployed 72, and the thickness in determined. If the thickness falls within a range corresponding to the thickness of one of the pages in the block 4, the printing process continues. Conversely, if the thickness falls outside of the range corresponding to the thickness of one of the pages in the block 4, the printing process is halted. Upon conclusion of the measurement process, the gauge 70 is retracted.

After redeploying top page 38 to the top of stack 4*a*, the paper limit guides 12*a* and 12*b* are lowered to the printing position and the height-adjustable stack support tables 6*a* and 6*b* are raised so as to press the printable top surfaces 44*a* and 44*b* against the paper limit guides 12*a* and 12*b*, thereby providing the substantially planar printing surface required for the printing process. In some embodiments, optic sensors 60 may be employed to assist in the alignment of the top surfaces 44*a* and 44*b*. It will be readily appreciated that substantially any suitable device and method for aligning the printable top surfaces 44*a* and 44*b* so as to be co-planar and provide a substantially planar printing surface is within the scope of the present invention.

Figure 8:
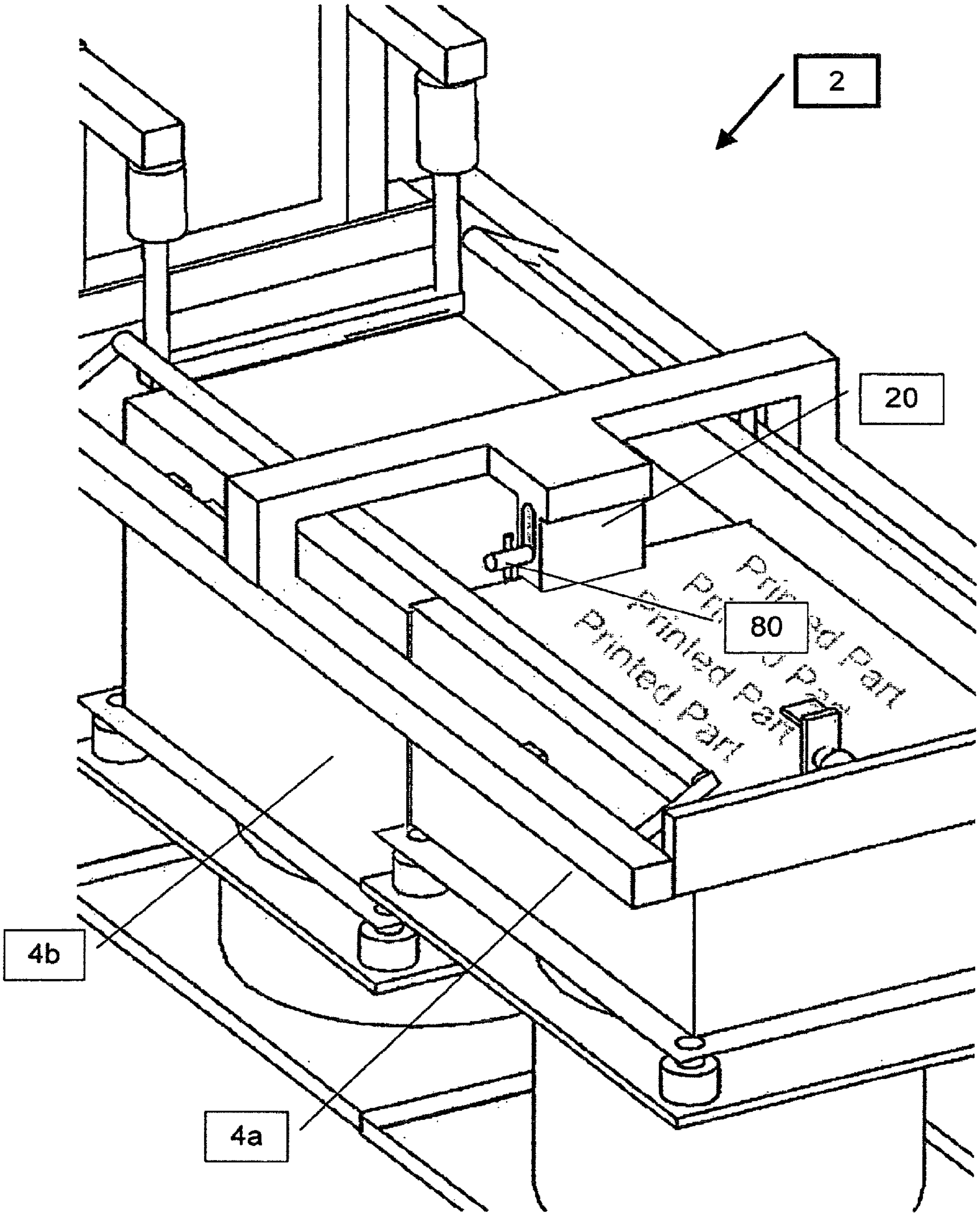
FIG. 8 is an isometric view of a preferred embodiment of a cutting element constructed and operative according to the teachings of the present invention, illustrated on the embodiment of FIG. 2.

As illustrated in FIG. 8, upon completion of the printing process, the stack 4*a* of now printed pages are separated from the unprinted pages in stack 4*b*. Preferably, separation of the two stacks 4*a* and 4*b* is accomplished with a cutting element 80, which is shown here associated with the printing device 20. It should be noted that the cutting element need not be associated with the printing device, and may be done manually. Therefore, substantially any method of separating the two stacks 4*a* and 4*b* is within the scope of the present invention.

Figure 9:
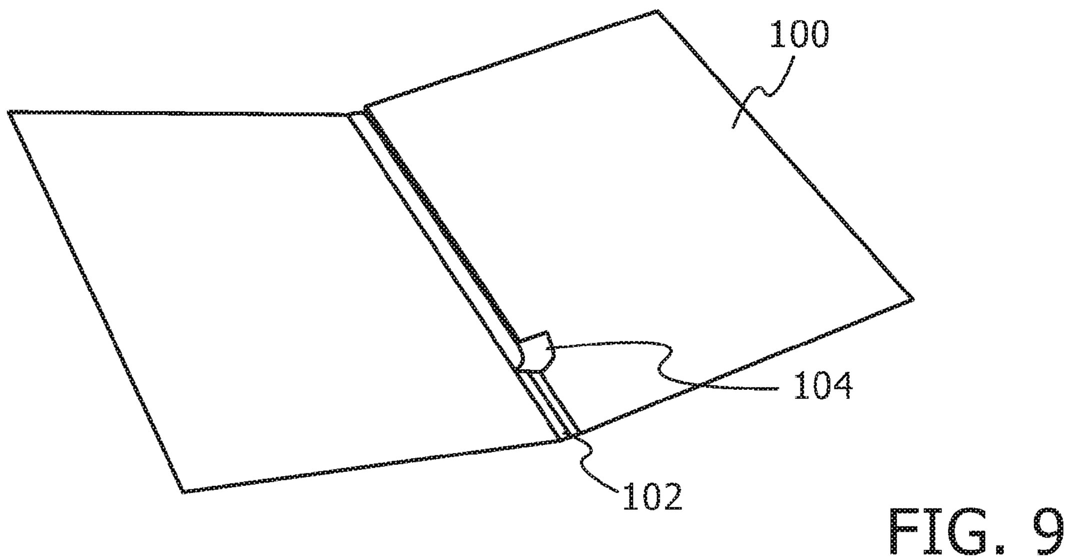
FIG. 9 is an isometric view of a book-cover constructed and operative according to the teachings of the present invention.
Figure 10:
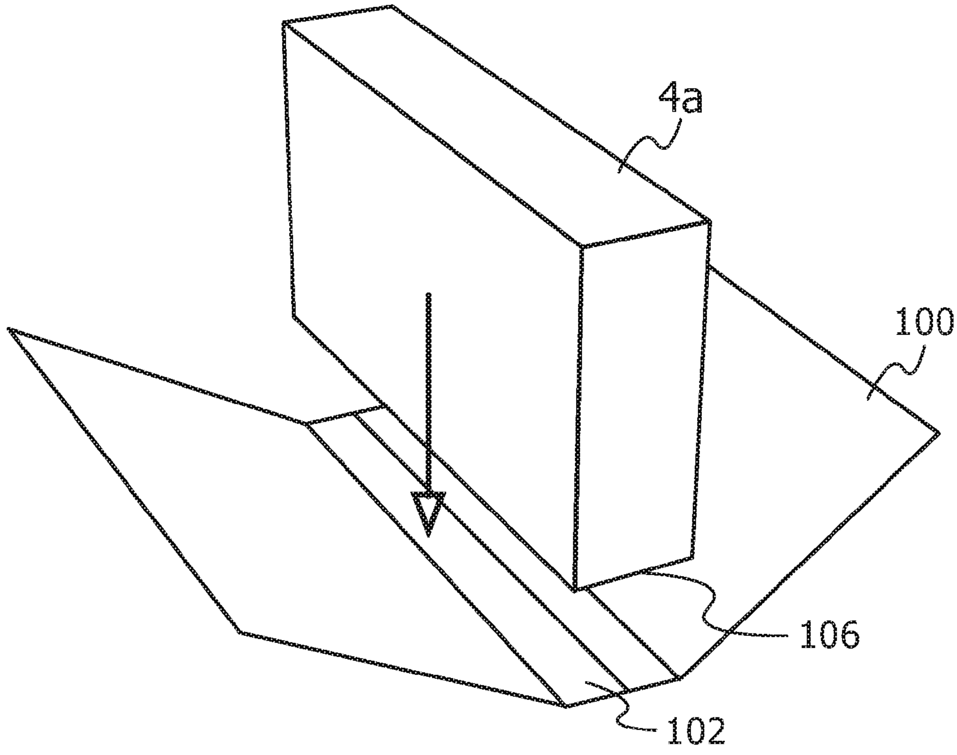
FIGS. 10-12 are isometric views of the process of attaching the printed pages of the book to the book-cover of FIG. 9.
Figure 11:
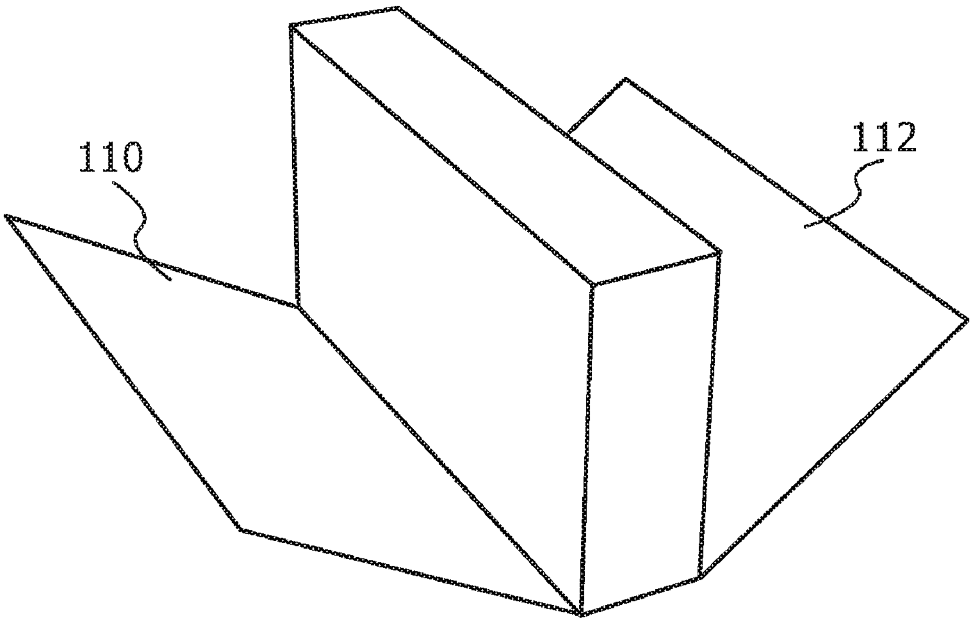
Figure 12:
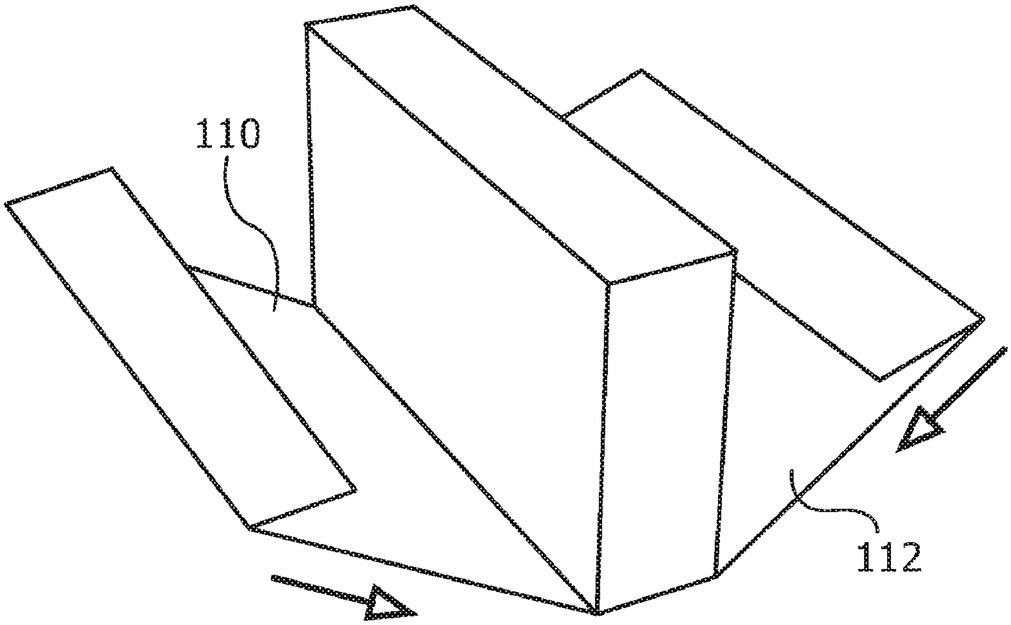

To complete the book, a book-cover 100 is attached to the stack 4*a* of now printed pages once the stack 4*a* is removed from the printing apparatus 2. The process of attaching the book-cover 100 is illustrated in FIGS. 9-12. The pre-fabricated adjustable book-cover 100 of the present invention includes an adhesive spine area 102 shielded by at least one peel-off cover-section 104 configured to reveal a predetermined adhesive area when removed. As illustrated in FIG. 9, in order to attach the stack 4*a*, the peel-off cover-section 104 is removed to reveal an area of the adhesive spine 102 corresponding to the size of a binding area 106 of stack 4*a*. The stack 4*a* is then pressed onto the revealed adhesive spine 102 (FIGS. 10 and 11).

Since the width of the binding area 106 will vary for one book to another, the front 110 and back 112 cover portions of the book-cover are preferably over-sized. Therefore, the front 110 and back 112 cover portions may need to be adjusted to the size of the stack 4*a* inserted into the book-cover. This may be accomplished by simply folding the front 110 and back 112 cover portions over to size. Alternatively, or additionally, the extreme edges of the front 110 and back 112 cover portions may each be configured with an adhesive portion (not shown) shielded by a peel-off cover-section configured to reveal an adhesive area when removed. It should be noted that substantially any method for attaching a book-cover to the pre-bound pages is within the scope of the present invention.

Therefore, the steps for producing a book according to the teachings of the present invention are as follows:

1. Insert a block 4 of printable pages into the printing apparatus 2, such that the block 4 is arranged in two stacks 4*a* and 4*b*.

2. Print the book on successive top surfaces 44*a* and 44*b* of the two stacks 4*a* and 4*b*.

3. Separate the printed pages of the book from the unprinted pages of the block 4 and remove the printed pages from the printing apparatus 2.

4. Prepare a book-cover 100 by peeling off at least one peel-off cover-section 104 to reveal an area of adhesive spine area 102 corresponding to the area of the binding 106 of the printed pages.

5. Attach the binding 106 of the printed pages to the spine 102 of the book-cover 100.

6. Adjust the extreme edges of the front 110 and back 112 cover portions as needed to fit the printed pages.

It should be noted that additionally the printing apparatus 2 of the present invention may be configured to check that the block 4 includes the number of pages required for the current printing job before printing begins. This may be accomplished by substantially any method known in the art such as, but not limited to, optical sensors, IR detectors, mechanical measuring mechanisms, and other electronic measures. Alternatively, or additionally, the block 4 itself may include an assignment of the number of pages such as but not limited to, numerals, patterns, and other graphic representations, printed on one or more of the sides of the block 4.

In another embodiment of the present invention, pages are turned using a roller incorporated in the printing bridge, and a wire mechanism is provided for separating the printed pages from the unprinted pages in the block.

Figure 13:
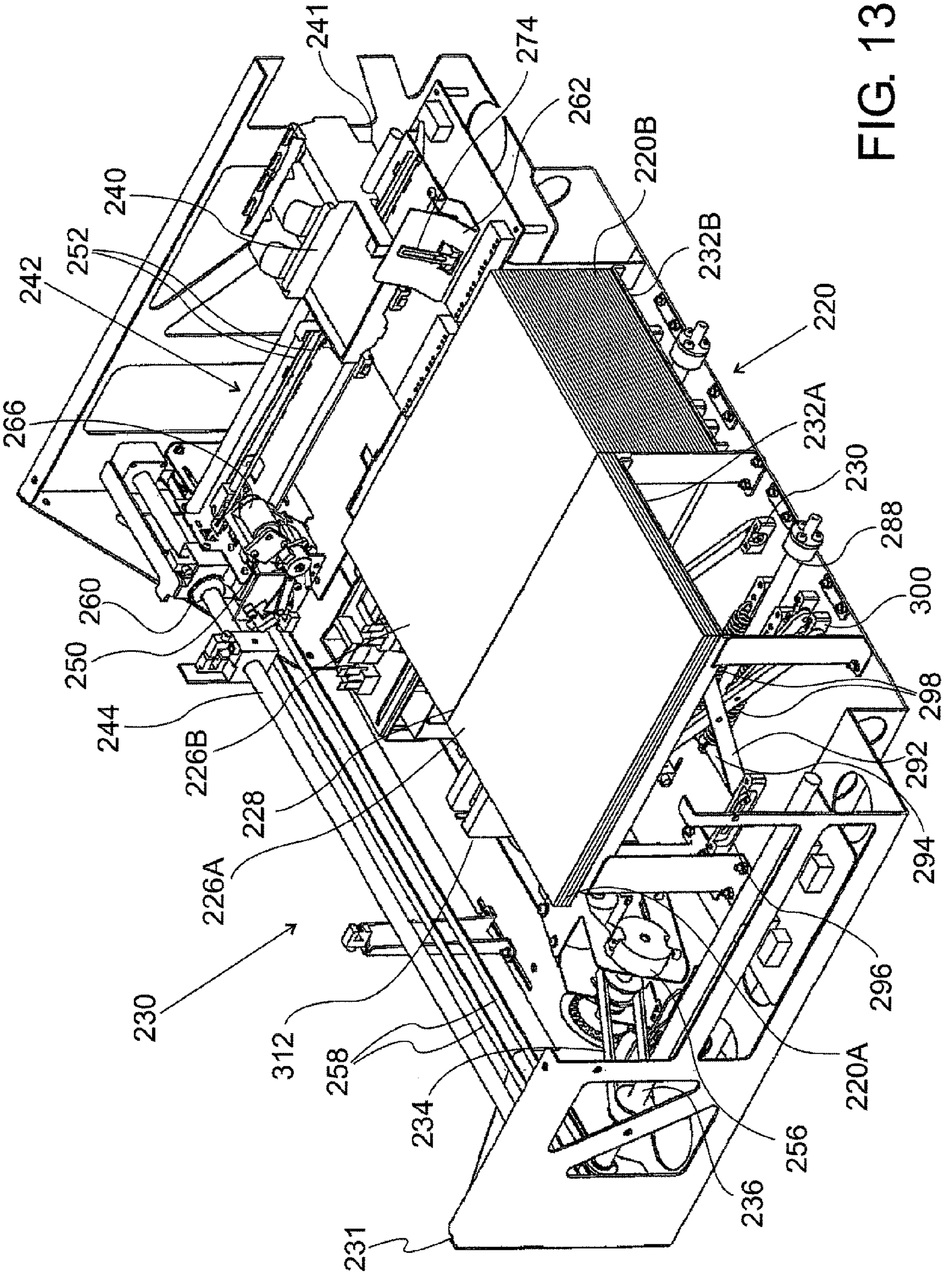
FIG. 13 is an isometric view of a printing apparatus with a page-turning roller and stack separation wire, according to embodiments of the present invention.

FIG. 13 is an isometric view of a printing apparatus with a page-turning roller and stack separation wire, according to embodiments of the present invention. Components of printing apparatus 230 are mounted on apparatus frame 231. Pre-bound block 220 of printable pages is shown as placed in printing apparatus 230. The printable pages of block 220 are bound along a binding edge by means of a flexible binding. During the printing process, the block 220 is arranged in two stacks 220A and 220B. The binding edges (222A and 222B in FIG. 14B) of stacks 220A and 220B face one another. Stacks 220A and 220B are joined by the flexible binding at binding connection 228. Printing is performed on printable top surfaces 226A and 226B of stacks 220A and 220B. There may be a point during the printing process when several pages will have already been printed, and more will remain to be printed. At such a point, pages in stack 220B below top surface 226B will be unprinted, while pages in stack 220A below top surface 226A will have already been printed.

Stacks 220A and 220B are supported by height-adjustable tables 232A and 232B, respectively. Up and down movement of height-adjustable tables 232A and 232B is controlled by a controller (not shown). Up and down movement of tables 232A and 232B may be actuated by, but not limited to, electric motors, pneumatic devices, hydraulic devices, or substantially any other suitable device know in the art.

A mechanism for raising or lowering height-adjustable table 232A or 232B in accordance with embodiments of the present invention is now described. Such a mechanism for raising and lowering table 232A is partially visible in FIG. 13.

A similar mechanism, not visible, is provided for raising and lowering table 232B. The height of table 232A is raised or lowered by means of scissor mechanism 292. Lower ends of one pair of legs of scissors mechanism 292 are fixed at pivot joints 300. The lower ends of the other two legs of scissor mechanism 292 are attached to bar 294. Each end of bar 294 is free to slide horizontally within a slot 296. One end of screw mechanism 288 is threaded into a threaded hole in bar 294. The other end of screw mechanism 288 is fixed.

When so instructed by a controller, a motor (not shown) turns screw mechanism 288. When screw mechanism 288 turns in one direction, the end of screw mechanism 288 is threaded deeper into bar 294, pulling bar 294 toward pivot joints 300. The effect is to bring bar 294 closer to pivot joints 300, closing scissors mechanism 292 and raising table 232A. Turning screw mechanism 288 in the reverse direction, withdraws the end of screw mechanism 288 from bar 294. Bar 294 is pushed away from pivots 300, opening scissors mechanism 292 and lowering table 232A.

One end of each spring 298 connects to bar 294. The other end of spring 298 connects to a point near pivot joint 300. Springs 298 assist in the raising or lowering of table 232A by providing pre-loading. Pre-loading reduces the load on the motor that turns screw mechanism 288.

Printing bridge 242 is mounted on two slide shafts 244. (One slide shaft is shown in FIG. 13; both in FIG. 14A.) Friction-reducing ring 260 enables printing bridge 242 to glide back and forth along slide shaft 244. In response to instructions from a controller, power unit 256 drives main belt 234. Motion of main belt 234 rotates torque shaft 236. Rotation of torque shaft 236 drives one or more timing belts 258. Timing belt 258 attaches to printing bridge 242. Driven timing belt 258 causes printing bridge 242 to slide a controlled distance along slide shaft 244. It should be understood that any other means known to one skilled in the art for effecting controlled motion of printing bridge 242 is within the scope of this invention.

Figure 14A:
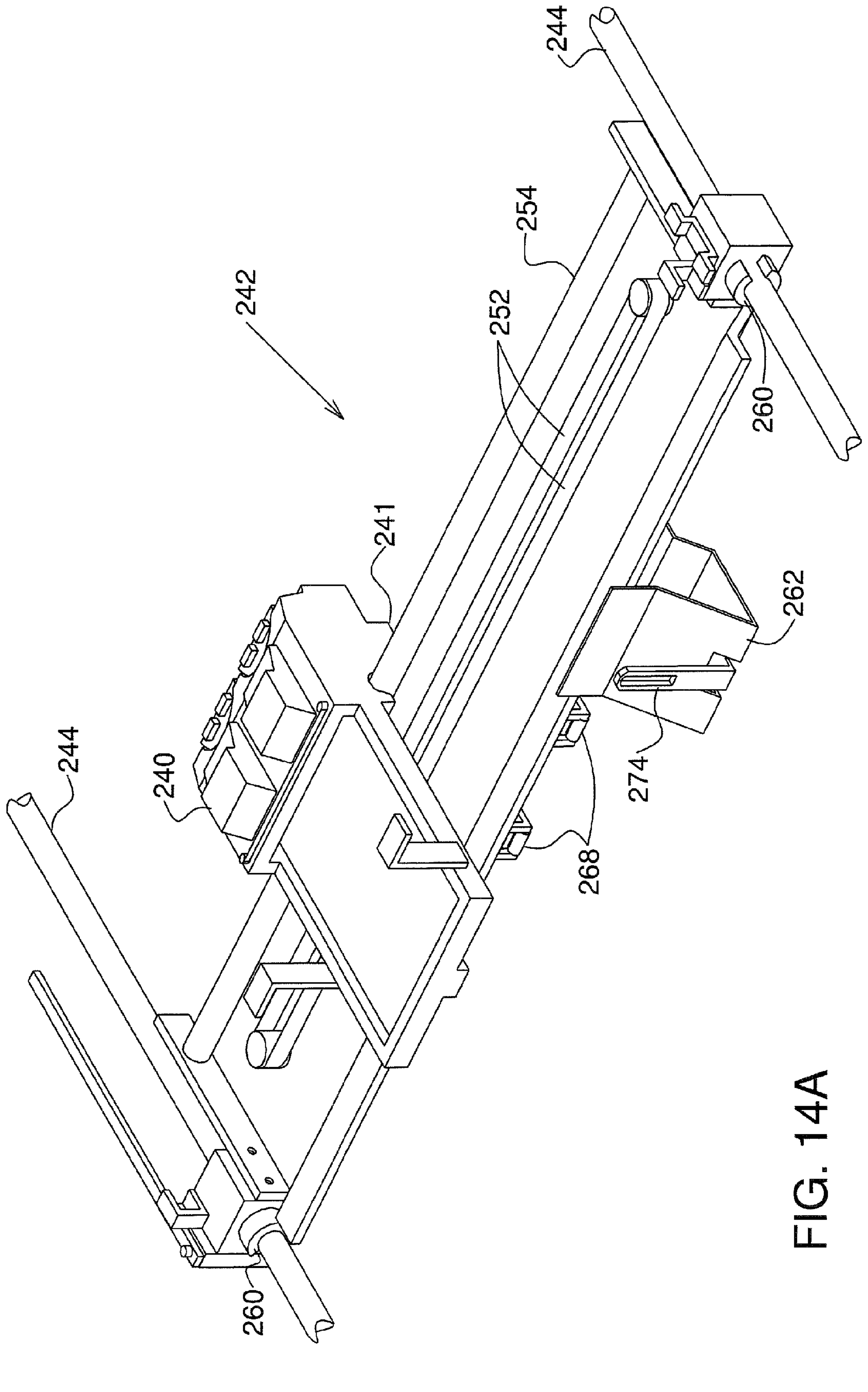
FIG. 14A is an isometric view of a printing bridge and printing device, in accordance with embodiments of the present invention.
Figure 14B:
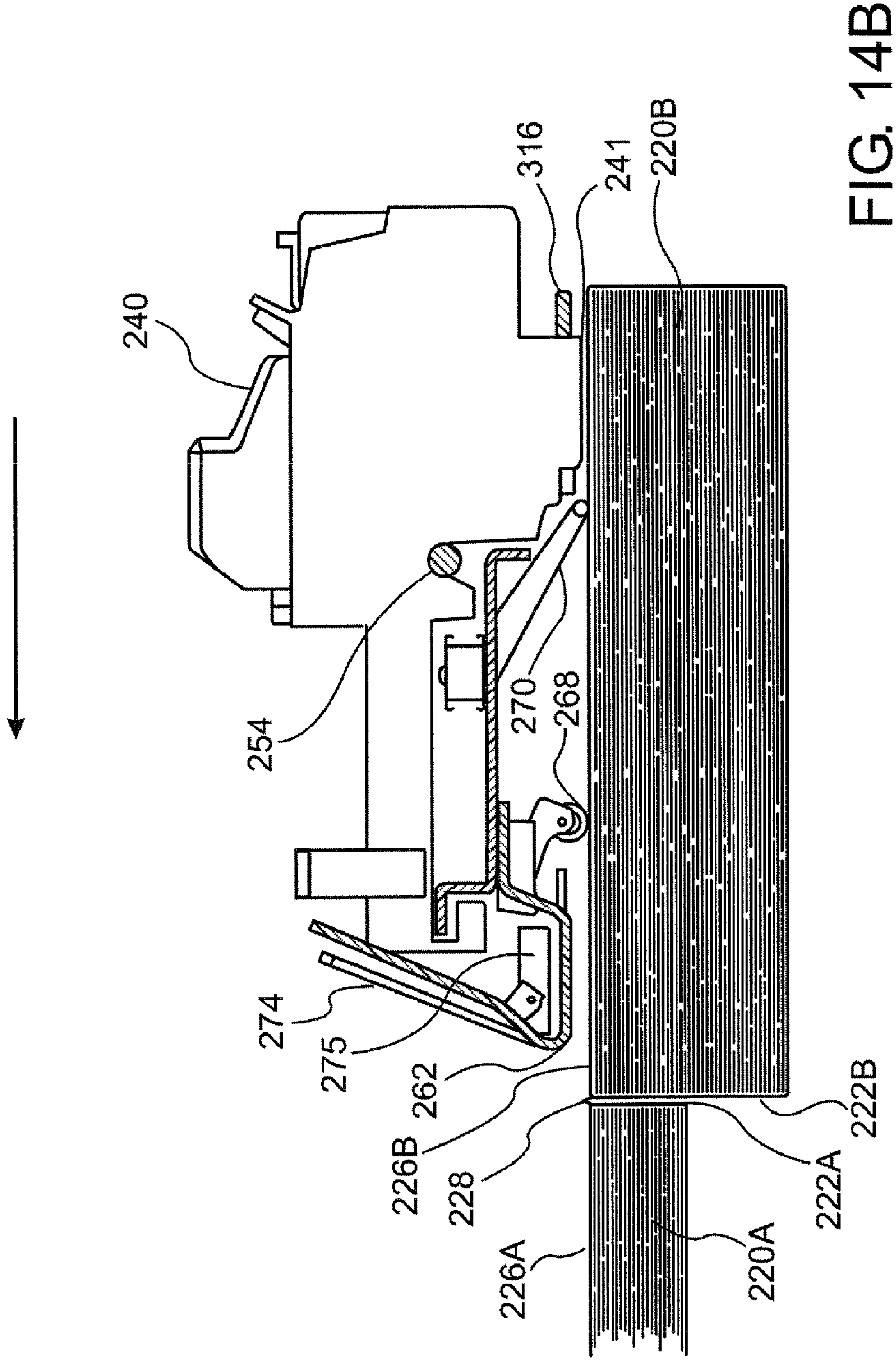
FIG. 14B is a side view of the printing bridge and printing device of FIG. 13A, shown as positioned above a block of pre-bound pages.

FIG. 14A is an isometric view of a printing bridge and printing device, in accordance with embodiments of the present invention. FIG. 14B is a side view of the printing bridge and printing device of FIG. 14A, shown as positioned above a block of pre-bound pages. Printing device 240 is mounted on guide shaft 254 of printing bridge 242. Printing device 240 moves back and forth along guide shaft 254 in response to an applied force, as follows: In response to instructions from a controller, a motor (not shown) drives belt 252. Belt 252 is attached to printing device 240. Motion of belt 252 causes printing device 240 to move a controlled distance along guide shaft 254. In embodiments of the present invention, motion of printing device 240 along shaft 254 is perpendicular to the motion of bridge 242 along slide shafts 244. The combined controlled motions of printing bridge 242 along slide shafts 244 and of printing device 240 along guide shaft 254 enable the controlled positioning of printing device 240 over printable top surfaces 226A and 226B. Printing head 241 of printing device 240 may thus print at controlled locations on printable top surfaces 226A and 226B. It should be understood that any other means known to one skilled in the art for effecting controlled motion of printing device 240 is within the scope of this invention.

During a typical printing operation in accordance with embodiments of the present invention, printing device 240 moves along guide shaft 254 while printing bridge 242 remains stationary at a position along slide shafts 244. During this motion of printing device 240, printing head 241 may print within the boundaries of a strip of the printable surface. The dimensions of the strip are determined by the dimensions of the print area covered by a stationary printing head and the distance that printing head 241 travels along guide shaft 254. The long dimension of the strip is oriented parallel to guide shaft 254. When the motion of printing device 240 along guide shaft 254 is complete, printing bridge 242 moves to an adjacent position along slide shafts 244. Printing device 240 then moves along shaft 254, printing within another strip of the printable surface that is adjacent to the first narrow strip.

The arrow in FIG. 14B indicates the direction of typical motion of printing bridge 242 during a typical printing operation, in accordance with embodiments of the present invention. Printing device 240 is mounted on printing bridge 242 such that during a typical printing operation, printing head 241 is on the trailing edge of printing bridge 242. Page-lifting assembly 250 (shown in FIG. 13 and FIG. 16) is mounted on the leading edge of printing bridge 242, at one end of printing bridge 242. In response to instructions from a controller, page-lifting assembly 250 causes roller 266 to be raised or lowered. When roller 266 is lowered, page-lifting assembly 250 causes roller 266 to rotate. The function of roller 266 is to lift a page. The lifted page is raised further by page-flipping tab 262. It should be noted the scope of the present invention includes employment of a page-lifting element configured of, but not limited to, a roller, an electrostatic element, a vacuum element, or any other element known in the art that is mountable on a movable bridge and capable of at least partially lifting a page.

Page-flipping tab 262 is mounted on the leading edge of printing bridge 242. Page-flipping tab 262 is inserted under the end of a lifted page. Page-flipping tab 262 raises the lifted page in advance of printing head 241, allowing printing head 241 to print on an unprinted surface beneath the raised page. Sensor lever 274 is located on page-flipping tab 262. When page-flipping tab 262 is inserted under a lifted page, the lifted page presses against sensor lever 274. Pressing against sensor lever 274 activates a sensor that sends a signal to a controller. For example, pressure lever 274 may connect to tab 275 that rotates when pressure lever 274 is pressed. Rotation of tab 275 may block a light beam. A photoelectric sensor detects the blocking of the light beam and sends a signal to a controller.

Figure 15B:
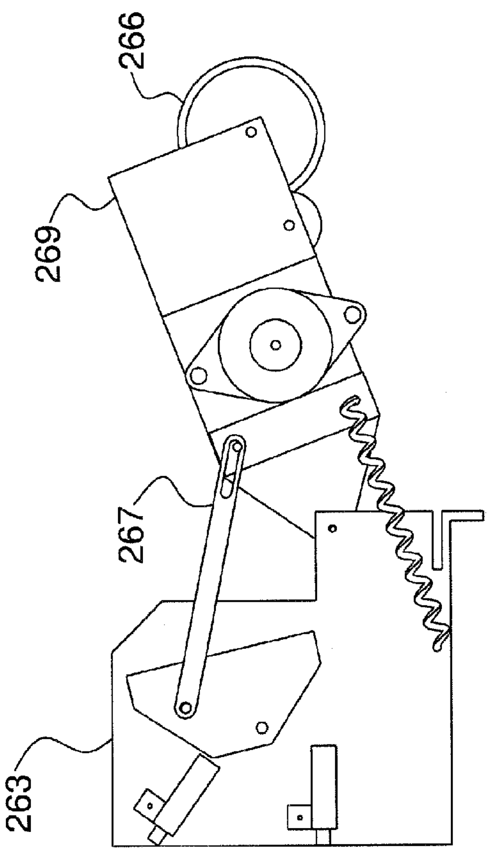
FIG. 15B is a side view of the page-lifting assembly of FIG. 14A during lowering.
Figure 15A:
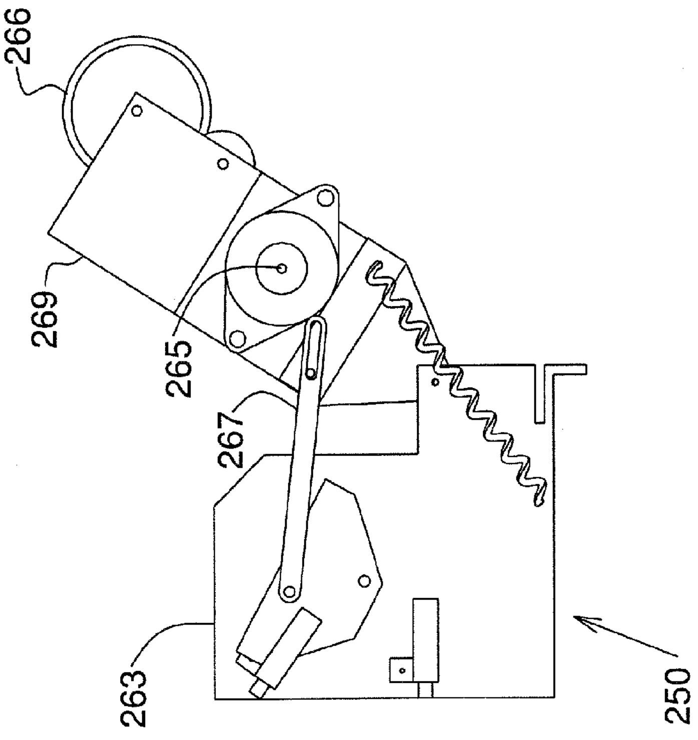
FIG. 15A is a side view of a page-lifting assembly in a raised state, in accordance with embodiments of the present invention.
Figure 15C:
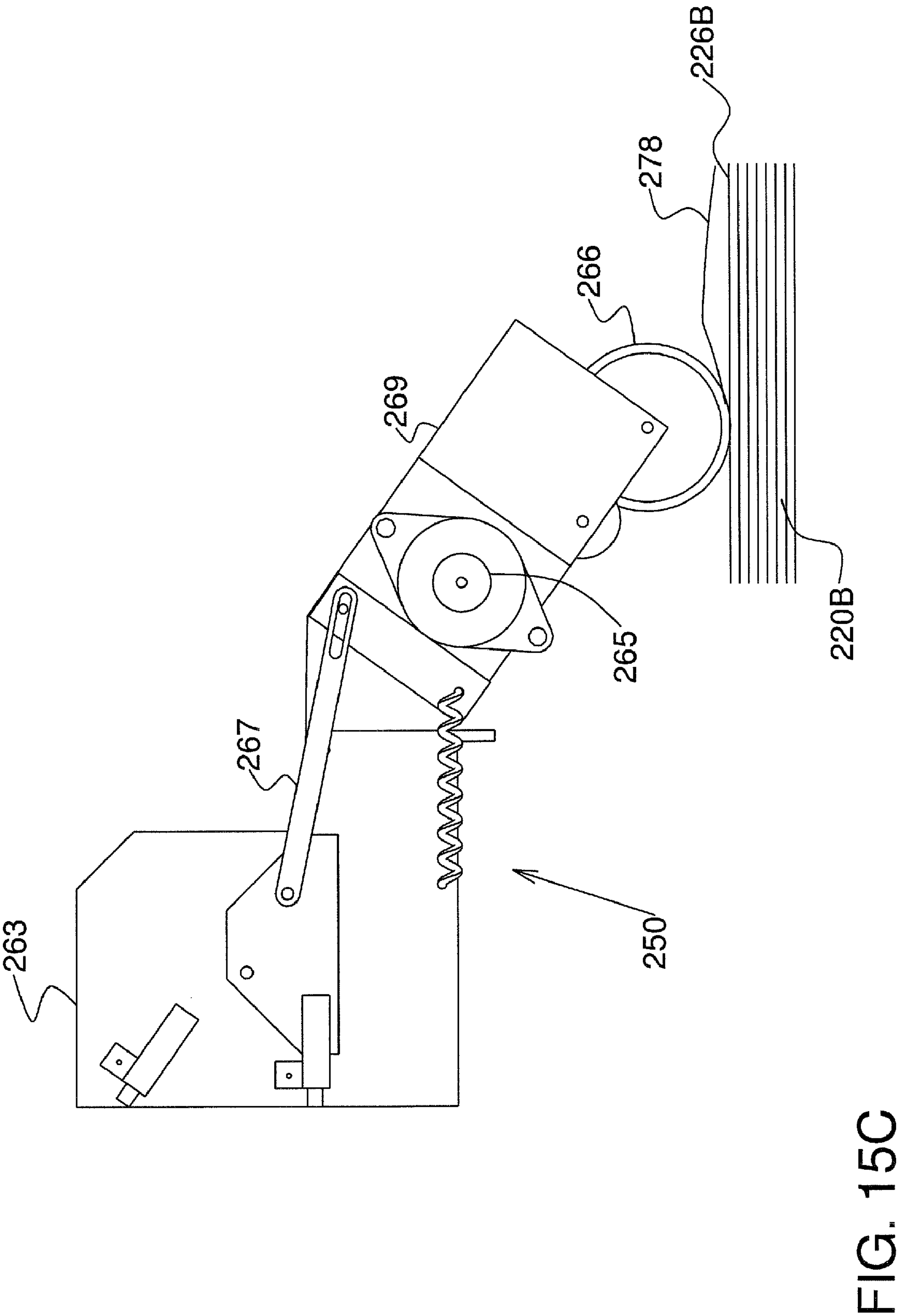
FIG. 15C is a side view of the page-lifting assembly of FIG. 14A having been lowered onto a stack of pages.

FIG. 15A, FIG. 15B, and FIG. 15C illustrate operation of the page-lifting assembly in accordance with embodiments of the present invention. We refer also to components shown in FIG. 13. Prior to operating page-lifting assembly 250, printing bridge 242 is positioned near the edge of top surface 226B that is distal to binding connection 228. Page-lifting assembly 250 is mounted to one end of printing bridge 242. In general, when page-lifting assembly 250 is not operating to lift a page, roller 266 of page-lifting assembly 250 is parked in a raised position. FIG. 15A is a side view of a page-lifting assembly in a raised state, in accordance with embodiments of the present invention. In order that roller 266 may lift a page, roller 266 must be lowered onto the page. FIG. 15B is a side view of the page-lifting assembly of FIG. 15A during lowering. Motor 251 (visible in FIG. 16) of roller-lifting mechanism 263 causes transmission arm 267 to apply a force to roller assembly 269, lowering roller 266. FIG. 15C is a side view of the page-lifting assembly of FIG. 15A having been lowered onto a stack of pages. Roller 266 has been lowered on to top page 278 of stack 220B.

Figure 16:
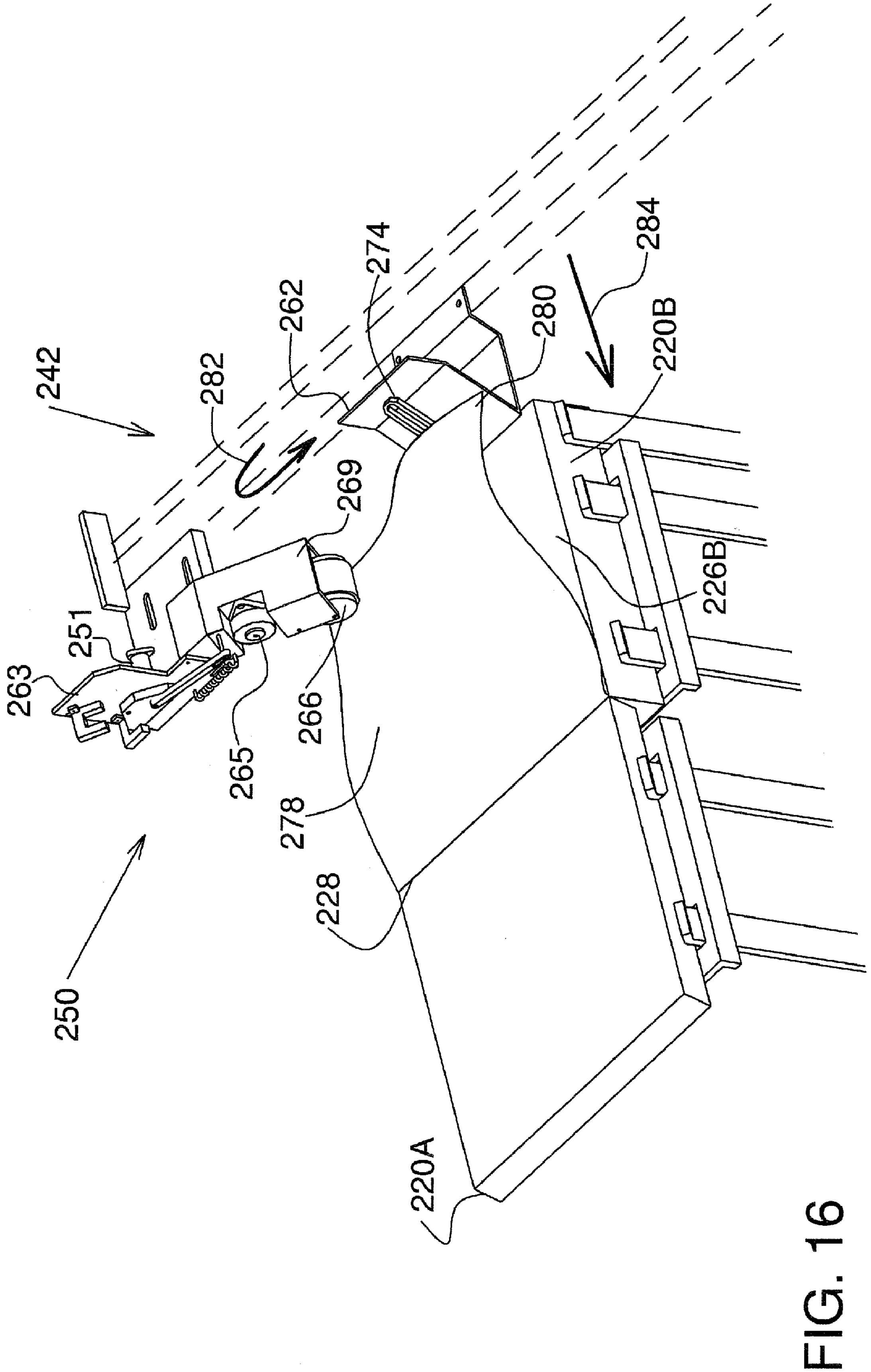
FIG. 16 illustrates page-lifting and flipping in accordance with embodiments of the present invention.

FIG. 16 illustrates page-lifting and flipping in accordance with embodiments of the present invention. Roller 266 is lowered onto a corner of top page 278 of stack 220B. Motor 265 of roller assembly 269 begins to operate. Via a transmission mechanism (not shown) of roller assembly 269, operation of motor 265 causes roller 266 to rotate in the direction indicated by arrow 282. Roller 266 applies a friction force in the direction of arrow 282 to the corner of page 278 on which roller 266 rests. In addition, binding connection 228 exerts a force on top page 278 that prevents the proximal end of top page 278 from sliding. The result of the combination of the applied forces is that top page 278 bends. The result of the bending of top page 278 is lifting of corner 280 of top page 278. Corner 280 is the corner of top page 278 that is distal to both roller 266 and binding connection 228. Lifting corner 280 of top page 278 partially exposes an unprinted printable upper surface 226B of stack 220B.

With corner 280 of top page 278 lifted, printing bridge 242 moves in the direction indicated by arrow 284. The motion of printing bridge 242 in the direction of arrow 284 inserts flipping tab 262, mounted on the leading edge of printing bridge 242, under lifted corner 280 of top page 278. Printing bridge 242 continues to move in the direction of arrow 284. When flipping tab 262 comes into contact with top page 278, top page 278 presses on sensor lever 274. Top page 278 pressing on sensor lever 274 causes a signal to be sent to a controller. The signal due to top page 278 pressing on sensor lever 274 indicates that a sufficient portion of flipping tab 262 has been inserted under corner 280 of top page 278. When flipping tab 262 is sufficiently inserted under corner 280, flipping tab 262 is capable of holding top page 278 above newly-exposed unprinted printable top surface 226B.

Pressing on sensor lever 274 generates a signal that causes page-lifting assembly 250 to raise roller 266 from top page 278. Raising roller 266 frees the page 278. Continued motion of printing bridge 242 in the direction of arrow 284 causes flipping tab 262 to continue to raise top page 278. Eventually, the motion of printing bridge 242 in the direction of arrow 284 brings printing head 241, which is located on the trailing side of printing bridge 242, to a point above exposed printable top surface 226B. Printing head 240 may begin printing on printable top surface 226B.

Referring to FIG. 14A and FIG. 14B, page-height sensors 268 are located on the underside of printing bridge 242, near the leading edge of printing bridge 242. In embodiments of the present invention, page-height sensors 268 include two separate, substantially identical, mechanical elements. Each mechanical element is in the form of a lever with a wheel mounted at its end. The wheel allows the lever to glide over a page surface without disturbing the page surface. The lever is pushed upward by contact with a surface below it. The distance through which the lever is pushed upward depends on the proximity of the surface below it. Alternatively, the sensor may include one or more mechanical, electromagnetic, optical, or sonic sensors, or any other type of sensor capable of detecting the proximity of a page surface without disturbing the page.

In embodiments of the present invention, each mechanical element of each page-height sensor 268 includes a lever. When the lever is pushed upward through a predetermined distance, that page-height sensor is activated and sends a signal to the controller. The predetermined distances for activating each of the two page-height sensors differ from one another. The predetermined distances are selected such that when the distance to the surface below falls within a predetermined acceptable range, one of page-height sensors 268 is activated, while the other is not. Activation of both sensors would indicate that the distance to the surface below is smaller than the acceptable range. A distance smaller than the acceptable range would indicate that the surface below is too high, and that the surface must be lowered. Activation of neither sensor would indicate that the distance to the surface below is greater than the acceptable range. A distance greater than the acceptable range would indicate that the surface below is too low, and that the surface must be raised.

Figure 17:
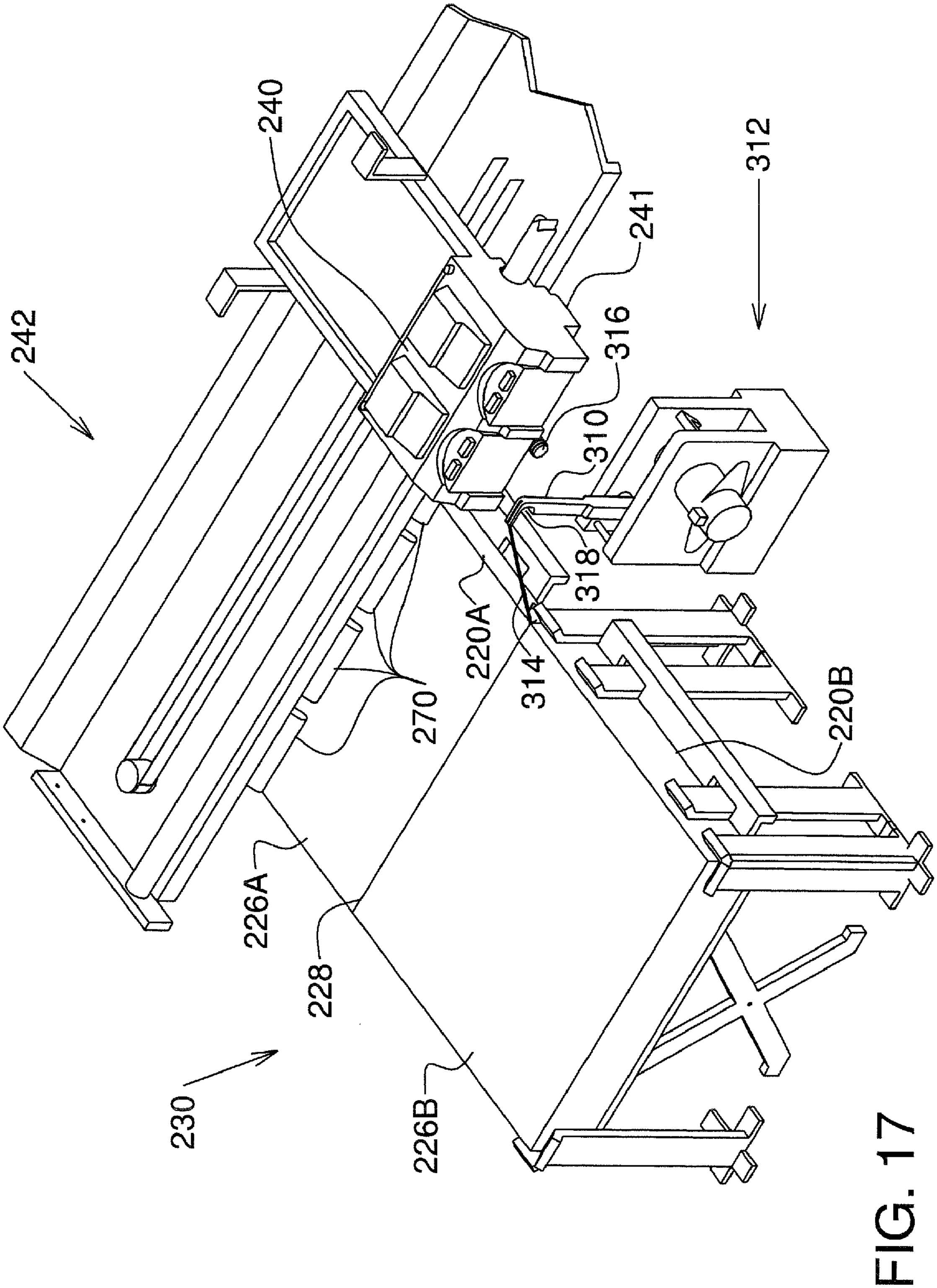
FIG. 17 shows components of the printing apparatus in accordance with embodiments of the present invention, as configured in preparation for separating the stacks of a pre-bound block.

In embodiments of the present invention, paper-smoothing fins 270 may be mounted on the underside of printing bridge 242 (visible in FIG. 14B and in FIG. 17). Paper-smoothing fins 270 rest on the surface of a page over which printing bridge 242 passes. Paper-smoothing fins 270 apply slight pressure to the page surface that is below printing bridge 242. The ends of paper-smoothing fins 270 that contact the page surface may be fitted with smooth elements. The smooth elements enable paper-smoothing fins 270 to glide over the page surface and apply downward pressure, without dragging the page sideways. When printing bridge 242 moves over a page surface during a printing operation, paper-smoothing fins 270 precede printing head 241 by a short distance. A function of paper-smoothing fins 270 is to assist in preparing an even printable surface to be printed upon by printing head 241.

FIG. 17 shows components of the printing apparatus in accordance with embodiments of the present invention, as configured in preparation for separating the stacks of a prebound block. Printing bridge 242 is positioned near the edge of top surface 226A that is distal to binding connection 228, having completed printing on top surfaces 226B and 226A. The trailing end of printing device 240 faces binding connection 228. Separation is effected by means of a cutting element. In embodiments of the present invention, the cutting element is strong, flexible wire 314. Within the scope of the present invention, cutting means may include, but are not limited to: flexible thread, string, or wire; knives, blades, or other edges; thermal means such as resistive electric wire, concentrated radiation, or lasers; chemical means; or any other means that may be used to cut a flexible binding.

Wire 314 extends from a bottom connection point (not shown) near the bottom of printing apparatus 230 to extendible arm 310. Extendible arm 310 may be raised or lowered by arm extension device 312. In general, and in particular during a printing operation, extendible arm 310 is in its lowered state, folded inside arm extension device 312. When extendible arm 310 is folded, wire 314 is situated near the bottom of printing apparatus 230. When wire 314 is situated near the bottom of printing apparatus 230, wire 314 does not interfere with the operation of other components of printing apparatus 230. In particular, wire 314 does not impede the motion of printing bridge 242, the motion of printing device 240, or the motion of height-adjustable tables 232A and 232B.

Figure 18:
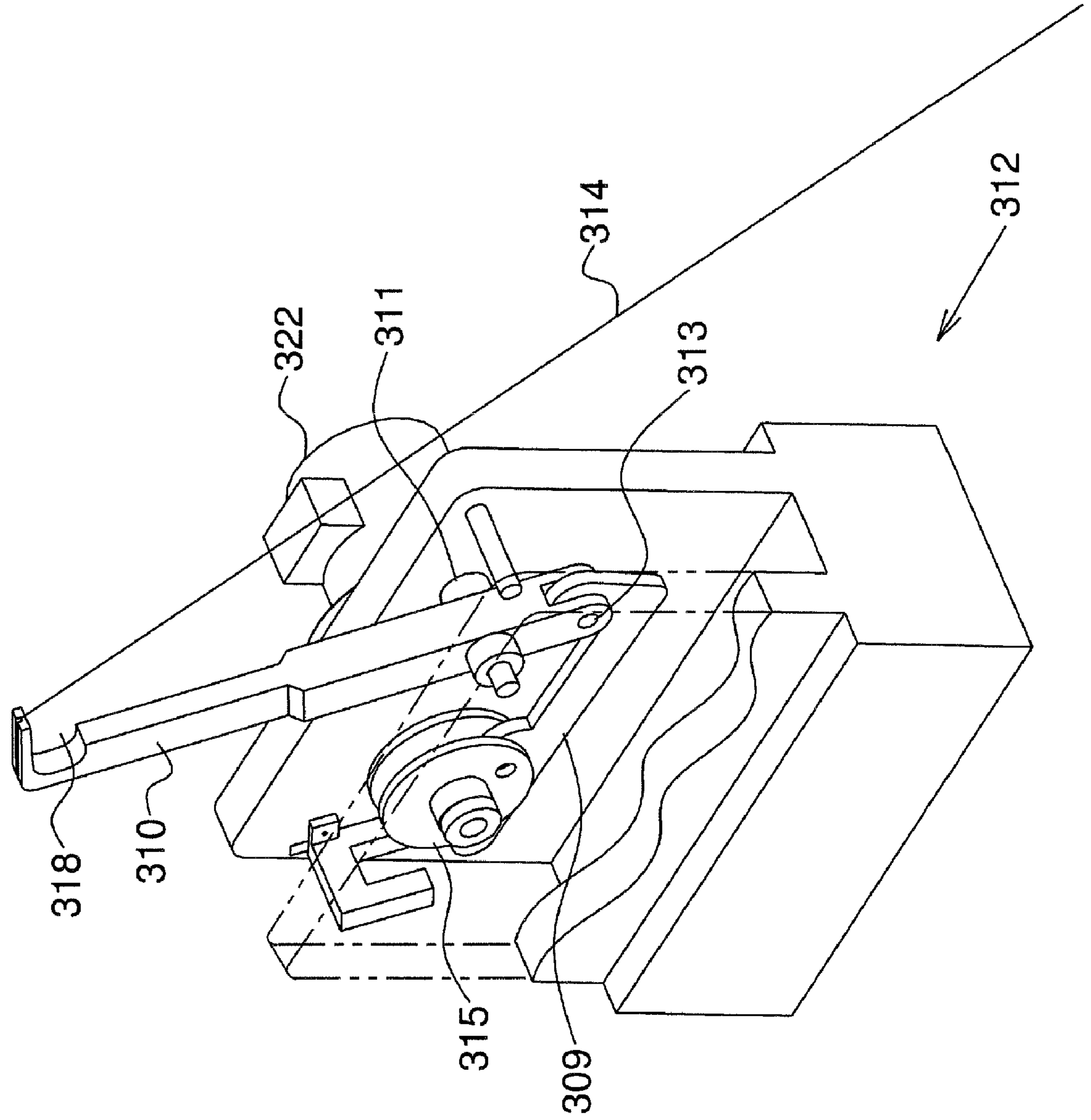
FIG. 18 shows an isometric view of an extendible wire-holding arm and the extension mechanism, in accordance with embodiments of the present invention.

FIG. 18 shows an isometric view of an extendible wire-holding arm and the extension mechanism, in accordance with embodiments of the present invention. Prior to separation of the stacks, arm extension device 312 extends extendible arm 310 to a raised position as follows: Motor 322 rotates wheel 315 in a clockwise direction. Clockwise rotation of wheel 315 pulls downward and leftward on transmission arm 309. Transmission arm 309 pulls downward on one end of extendible arm 310 at joint 313. Pulling downward on joint 313 causes extends extendible arm 310 to rotate clockwise about axis 311. Clockwise rotation of extendible arm 310 raises extendible arm 310 to an extended state.

Figure 19:
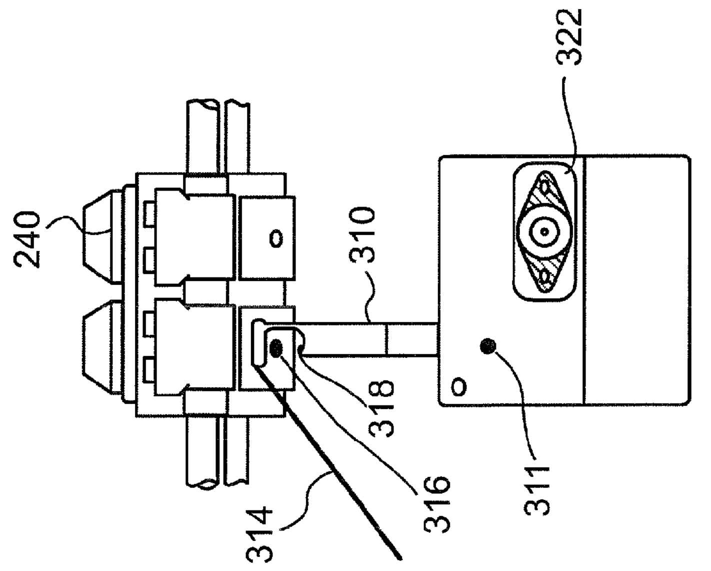
FIG. 19 shows a side view of the wire-holding arm of FIG. 17 in an extended state.

FIG. 19 shows a side view of the wire-holding arm of FIG. 18 in an extended state. Extending arm 310 causes wire 314 to extend from a bottom connection point (not shown) near the bottom of printing apparatus 230, to a connection point near the top of arm 310. The height of the connection point near the top of arm 310 is greater than the height of binding connection 228. A portion of wire 314 is in contact with the end of binding connection 228 closest to arm 310 (contact point not shown). Most of the remainder of wire 314 lies directly below binding connection 228 (not shown).

When arm 310 is extended, indentation 318 on arm 310 aligns with pin 316 on printing device 240. Indention 318 is of such shape and size as to accommodate pin 316. Therefore, controlled movement of printing device 240 and printing bridge 242 may insert pin 316 into indentation 318. When pin 316 is inserted into indentation 318, movement of pin 316 toward the left (as viewed in FIG. 19) causes pin 316 to pull wire 314, lifting wire 314 upward and leftward. Contact of wire 314 with binding connection 228 (not shown) resists the upward and leftward lifting of wire 314 by the motion of pin 316. The upward and leftward lifting of wire 314 against binding connection 228 causes wire 314 to sever binding connection 228.

Figure 20:
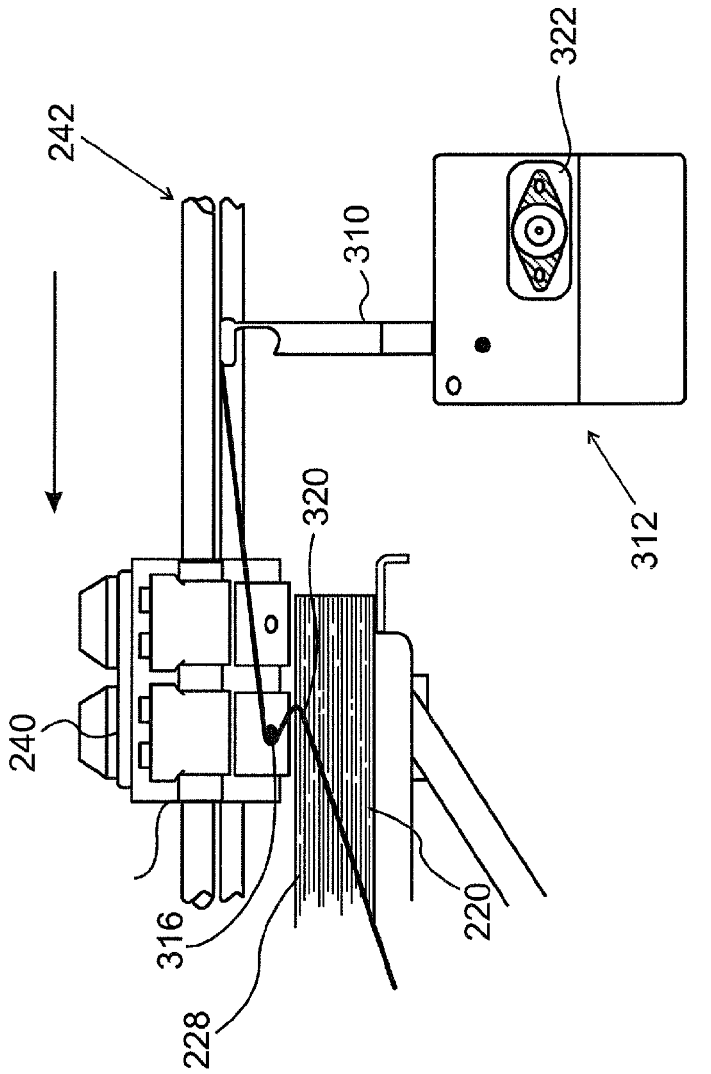
FIG. 20 is a cross-sectional view through the binding connection of a pre-bound block, illustrating the cutting of a binding connection, in accordance with embodiments of the present invention.

FIG. 20 is a cross-sectional view through the binding connection of a pre-bound block, illustrating the cutting of a binding connection, in accordance with embodiments of the present invention. Printing device 240 and pin 316 move in the direction of the arrow. Wire 314 contacts binding separation 228 at contact point 320. Motion of pin 316 in the direction of the arrow causes wire 314 to apply a force to binding separation 228 at contact point 320. The force applied by wire 314 to binding connection 228 at contact point 320 severs binding connection 228 at contact point 320. Continued motion of pin 316 in the direction of the arrow causes contact point 320 to move in the direction of the arrow along the entire length of binding connection 228. At the point illustrated in FIG. 20, binding connection 228 to the right of contact point 320 has been severed, while binding connection 228 to the left of contact point 320 remains intact. In this manner, the motion of pin 316 in the direction of the arrow causes wire 314 to sever binding connection 228 along its entire length. Continued motion of printing device 240 in the direction of the arrow brings printing device 240 to a position near the end of printing bridge 242 furthest from arm 310. At this point, printing bridge 242 may be moved in a direction away from severed binding connection 228. This motion of printing bridge 242 removes pin 316 so that pin 316 no longer lifts wire 314. When pin 316 is removed from wire 314, extension device 312 lowers extendible arm 310 to its retracted state. Retracting extendible arm 310 again causes the entire length of wire 314 to be situated near the bottom of the printing apparatus.

Severing binding connection 228 along its entire length separates the two stacks that make up block 220 into two separate blocks of bound pages. One of the two separate blocks consists entirely of printed pages, while the other block consists entirely of unprinted pages. The block of printed pages may then be removed from the printing apparatus.

Printing of a book in accordance with embodiments of printing apparatus 230 is now explained with reference to FIG. 13. Actions performed during operation of printing apparatus 230 are performed in response to instructions sent to various components of printing apparatus 230 by one or more controllers (not shown).

Block 220 of printable pages is shown as placed in printing apparatus 230. Block 220 is pre-bound by a flexible binding 222A and 222B (indicated in FIG. 14B). Initially, when printing apparatus 230 begins to print a book, all pages of block 220 are arranged in a single stack 220B. At some later point during a printing operation, block 220 is arranged in two stacks 220A and 220B. Stacks 220A and 220B rest on height-adjustable tables 232A and 232B, respectively Printing is performed on printable top surfaces 226A and 226B, of stacks 220A and 220B, respectively. The heights of tables 232A and 232B are adjusted so that surfaces 226A and 226B are substantially coplanar. Top surfaces 226A and 226B are joined at binding connection 228.

Initially, when printing apparatus 230 begins to print a book, printing may be performed on printable top surface 226B of single stack 220B only. Alternatively, the page turning operation described below may be performed already on the first sheet, immediately creating two stacks 220A and 220B with printable top surfaces 226A and 226B. Beginning the printing operation with turning a page would leave the first page blank. Such a page may be left intentionally blank if, for example, it were to serve as an end paper.

At a later point during the printing operation, several pages will have been printed, and more remain to be printed. At such a point, pages in stack 220B below top surface 226B are unprinted, while pages in stack 220A below top surface 226A will have already been printed.

During printing, printing bridge 242 and printing device 240 move sequentially to position printing head 241 above various locations of printable top surfaces 226A and 226B. Printing head 241 (indicated in FIG. 14B) may print on the various locations of surfaces 226A and 226B above which it is positioned.

During a printing operation, the general direction of the motion of printing bridge 242 is in the direction indicated by the arrow in FIG. 14B. The result of the indicated motion is that printing head 241 prints on printable top surface 226B prior to printing on printable top surface 226A. Therefore, when starting to print on top surface 226B, printing bridge 242 is located at a starting position near the edge of top surface 226B that is distal to binding connection 228. During printing, the direction of motion of bridge 242 is toward the far edge of top surface 226A, the edge that is distal to binding connection 228. When printing on top surface 226A is complete, printing bridge 242 is located near the distal edge of surface 226A. Prior to returning printing bridge to its starting position, tables 232A and 232B are both lowered through a short, pre-determined distance. Printing bridge 242 is then returned to its starting position near the distal edge of top surface 226B. The purpose of lowering tables 232A and 232B prior to the return motion of printing bridge 242 to its starting position is to prevent the return motion of printing bridge 242 from disturbing top surfaces 226A and 226B. After printing bridge 242 is returned to its starting position, tables 232A and 232B are raised by the pre-determined distance through which they had been previously lowered. Tables 232A and 232B are thus returned to their previous heights. At this point, printing bridge 242 and printing device 240 are in position to print on another pair of printable top surfaces.

Prior to resuming printing on top surfaces 226B and 226A, new unprinted surfaces must be exposed. New unprinted surfaces are exposed by lifting the top page of stack 220B by means of page-lifting assembly 250. Lifting the top page of stack 220B exposes an unprinted printable top surface 226B. The lifted page is then flipped by means of flipping tab 262 on to the top of stack 220A, exposing the unprinted side of the flipped page. The unprinted side of the flipped forms a printable top surface 226A of stack 220A.

Continued motion of printing bridge 242 continues to cause flipping tab 262 to raise top page 278. Simultaneously, printing device 240 (shown in FIG. 12) moves back and forth along printing bridge 242, allowing printing head 241 (shown in FIG. 12) to print on printable top surface 226B. Flipping tab 262 eventually raises page 278 a sufficient amount that page 278 flips about its edge that is connected to binding connection 228 and onto stack 220A. Flipping page 278 onto stack 220A exposes the unprinted side of page 278. The unprinted side of page 278 resting atop stack 220A forms a new printable top surface 226A of stack 220A.

Continued motion of printing bridge 242 enables printing head 241 to print over the entire printable area printable top surface 226B. Continued motion of printing bridge 242 causes printing head 241 to cross binding connection 228 and to print on the newly exposed printable top surface 226A. Thus, a single motion of bridge 242 sweeping across the top surfaces of the pre-bound stacks both exposes new unprinted surfaces and enables printing on the unprinted surfaces.

Quality of printing may be adversely affected when the distance between printing head 241 and printable top surface 226B or 226A is larger or smaller than an acceptable range. The height of printing head 241 relative to the remainder of printing apparatus 230 is fixed. Therefore, the distance between printing head 241 and printable top surface 226B or 226A is determined by the height of printable top surface 226B or 226A. The distance between printable top surface 226A or 226B and printing head 241 is determined by page-height sensors 268 on the underside of printing bridge 242.

Redeploying a top page from stack 220B to stack 220A lowers the height of top surface 226B of stack 220B, and raises the height of top surface 226A of stack 220A. The change in height of each top surface is equal to the thickness of a single page. In accordance with embodiments of the present invention, the range of acceptable distances between printing head 241 and printable top surface 226B or 226A may be larger than the thickness of a single page. In this case, after redeploying a single page from stack 220B to stack 220A, the heights of top surfaces 226B and 226A may remain within the acceptable range of surface heights. When the heights of top surfaces 226B and 226A remain within the acceptable range of surface heights, printing may proceed without any adjustment to the heights of top surfaces 226B and 226A. However, it may occur that after redeployment of a page from stack 220B to stack 220A, page-height sensors 268 indicate that the distance between printing head 241 and printable top surface 226B or 226A is greater than or less than the acceptable range. In this case height-adjustable tables 232B and 232A adjust the heights of stacks 220B and 220A respectively, in order to bring the heights of printable top surfaces 226B and 226A to within the acceptable range.

In embodiments of the present invention, the signals output by page-height sensors 268 are read by a controller at two points during the motion of bridge 242 across printable top surfaces 226B and 226A. One point occurs when bridge 242 is located near the end of top surface 226B that is distal to binding connection 228, prior to the commencement of printing on printable top surface 226B. At this point, page-height sensors 268 are read in order to indicate the distance between printing head 241 and printable top surface 226B of stack 220B. At this point, should page-height sensors 268 indicate that the distance between printing head 241 and printable top surface 226B is greater than the acceptable range, height-adjustable table 232B raises stack 220B through a pre-determined distance. The pre-determined distance is so determined as to raise the height of top surface 226B to within the acceptable range of heights for printable top surface 226B. Concurrently, table 232A lowers stack 220A through the same pre-determined distance. The motion of printing bridge 242 in the general direction toward top surface 226A then continues. During the course of the motion of printing bridge 242, printing device 240 moves back and forth along the length of printing bridge 242. The motion of printing device 240 along printing bridge 242 is perpendicular to the direction of the motion of printing bridge 242. The combined motion of printing bridge 242 and printing device 240 may position printing head 241 over any point on printable top surface 226B. Therefore, printing head 241 may print as needed on printable top surface 226B.

According to embodiments of the present invention, page-height sensors 268 are read at a second point during the motion of printing bridge 242 over printable top surfaces 226B and 226A. This second point occurs when the leading edge of printing bridge 242 crosses binding connection 228 and page-height sensors contact top surface 226A. At this point, page-height sensors 268 are read in order to indicate the distance between printing head 241 and printable top surface 226A of stack 220A. A page may have been redeployed from stack 220B to stack 220A, increasing the height of top surface 226A. At this point, should page-height sensors 268 indicate that the distance between printing head 241 and printable top surface 226A is smaller than the acceptable range, height-adjustable table 232A lowers stack 220A through a pre-determined distance. The pre-determined distance is so determined as to lower the height of top surface 226A to within the acceptable range of heights for printable top surface 226A. Concurrently, table 232B raises stack 220B through the same pre-determined distance. Movement of printing bridge 242 and printing device 240 over printable top surface 226A then continues. During the course of the motion of printing bridge 242 and printing device 240, printing head 241 may print on printable top surface 226A.

The process of printing on printable top surfaces of pre-bound stacks of pages, of redeploying a top page from one stack onto the other to expose unprinted top surfaces, and of adjusting the heights of the stacks as needed, continues until all of the contents of the book have been printed.

Referring to FIG. 17, in accordance with embodiments of the present invention, when printing is complete, stack 220A consists entirely of printed bound pages, and stack 220B consists entirely of unprinted bound pages. Printing bridge 242 is positioned above tope surface 226A, near the edge of top surface 226A that is distal to binding connection 228. Arm extension device 312 extends arm 310 to its raised state. When raised, extendible arm 310 holds an end of wire 314 at a height above the height of binding connection 228. The remainder of wire 314 lies below binding connection 228.

Printing device 240 is positioned along printing bridge 242 such that pin 316 aligns with indentation 318 on extendible arm 310. With pin 316 aligned with indentation 318, printing bridge 242 moves pin 316 toward extendible arm 310. Motion of printing bridge 242 toward extendible arm 310 continues until pin 316 is inserted into indention 318.

With pin 316 inserted through indentation 318, printing device 240 moves along printing bridge 242, conveying pin 316 away from extendible arm 310. Conveying pin 316 away from arm 310 causes pin 316 to pull wire 314 upward and against binding connection 228. Continued motion of pin 316 away from arm 310 and pulling on wire 314 causes wire 314 to sever binding connection 228. Continued motion of printing device 240 toward the end of printing bridge 242 that is distal to arm 310 completely severs binding connection 228. Severing binding connection 228 separates stack 220A of printed pages from stack 220B of unprinted pages. After separation of stack 220A from stack 220B, bridge 242 moves away from wire 314 until pin 316 disengages from wire 314. Extension device 312 retracts extendible arm 310 to its folded state. Retracting extendible arm 310 causes the entire length of wire 314 to be situated near the bottom of printing apparatus 230. Situating wire 314 near the bottom of printing apparatus 230 prevents wire 314 from interfering with the motion of moving components during any further operation of printing apparatus 230.

After printed stack 220A is separated from unprinted stack 220B, printed stack 220A may be removed from printing apparatus 230.

It will be appreciated that the above descriptions are intended only to serve as examples and that many other embodiments are possible within the spirit and the scope of the present invention.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. An apparatus for printing on the pages of a block of printable pages that are pre-bound by a binding along a binding-edge of each page, the apparatus comprising:

a block support structure comprising a controller and two height-adjustable tables for supporting the block of printable pages in two adjacent stacks, so that when a page is turned from atop a first stack to an adjacent second stack, the two adjacent stacks present substantially co-planar printable top surfaces;

a moveable bridge adapted to movement in at least one dimension, comprising a printing device, and configured to move the printing device in a controlled manner over the printable top surfaces so as to print on said printable top surfaces;

at least one sensor for sensing the height of either of the printable top surfaces that is coupled to the moveable bridge; and a page-turning mechanism connected to the moveable bridge, comprising a roller configured for partially lifting a bound top page of the first stack, and a page-flipping tab for sliding under the partially lifted bound top page so that when the bridge is moved the partially lifted bound top page is flipped over to the second stack presenting new printable top surfaces for the printing device to print on.

2. The apparatus as claimed in claim 1, wherein the page-turning mechanism comprises an electric motor for driving the roller.

3. The apparatus as claimed in claim 1, wherein the roller is rotatable about a rotation axis that is substantially perpendicular to a direction of motion of the moveable bridge.

4. The apparatus as claimed in claim 1, wherein the flipping tab is located on a leading edge of the moveable bridge.

5. The apparatus as claimed in claim 1, wherein said at least one sensor is coupled to the printing device.

6. The apparatus as claimed in claim 5, wherein said at least one sensor comprises at least two sensing devices, wherein one of said at least two sensing devices is configured to sense if the height of said either of the printable top surfaces exceeds a maximum acceptable value, and another one of said at least two sensing devices is configured to sense if the height of said either of the printable top surfaces exceeds a minimum acceptable value.

7. The apparatus as claimed in claim 1, comprising a separating mechanism for separating the first and second stacks of pages.

8. The apparatus as claimed in claim 7, wherein the separating mechanism comprises a wire and a wire-pulling device for pulling the wire between the first and second stacks of pages, thus separating the first and second stacks of pages.

9. The apparatus as claimed in claim 8, wherein the wire-pulling device is attached to the printing device, whereby movement of the printing device pulls the wire.

10. The apparatus as claimed in claim 8, comprising a device for raising and lowering the wire.

11. An apparatus for printing on the pages of a block of printable pages that are pre-bound by a binding along a binding-edge of each page, the apparatus comprising:

a block support structure comprising two height-adjustable tables for supporting the block of printable pages in two adjacent stacks, so that when a page is turned from atop a first stack to an adjacent second stack, the two adjacent stacks present substantially co-planar printable top surfaces;

a moveable bridge adapted to movement in at least one dimension, comprising a printing device, and configured to move the printing device in a controlled manner over the printable top surfaces so as to print on said printable top surfaces;

a page-turning mechanism connected to the moveable bridge, comprising a roller configured for partially lifting a bound top page of the first stack, and a page-flipping tab for sliding under the partially lifted bound top page so that when the bridge is moved the partially lifted bound top page is flipped over to the second stack presenting new printable top surfaces for the printing device to print on; and a separating mechanism for separating the first and second stacks of pages, the separating mechanism comprising a wire and a wire-pulling device for pulling the wire between the first and second stacks of pages so as to separate the first and second stacks of pages.

12. The apparatus as claimed in claim 11, wherein the page-turning mechanism comprises an electric motor for driving the roller.

13. The apparatus as claimed in claim 11, wherein the roller is rotatable about a rotation axis that is substantially perpendicular to a direction of motion of the moveable bridge.

14. The apparatus as claimed in claim 11, wherein the flipping tab is located on a leading edge of the moveable bridge.

15. The apparatus as claimed in claim 11, wherein the block support structure comprises a controller and at least one sensor for sensing the height of either of the printable top surfaces.

16. The apparatus as claimed in claim 15, wherein said at least one sensor is coupled to the moveable bridge.

17. The apparatus as claimed in claim 16, wherein said at least one sensor is coupled to the printing device.

18. The apparatus as claimed in claim 17, wherein said at least one sensor comprises at least two sensing devices, wherein one of said at least two sensing devices is configured to sense if the height of said either of the printable top surfaces exceeds a maximum acceptable value, and another one of said at least two sensing devices is configured to sense if the height of said either of the printable top surfaces exceeds a minimum acceptable value.

19. The apparatus as claimed in claim 11, wherein the wire-pulling device is attached to the printing device, whereby movement of the printing device pulls the wire.

20. The apparatus as claimed in claim 11, comprising a device for raising and lowering the wire.

* * * * *